(12) United States Patent
Takizawa et al.

(10) Patent No.: US 12,547,539 B2
(45) Date of Patent: Feb. 10, 2026

(54) MEMORY SYSTEM AND MEMORY DEVICE

(71) Applicant: Kioxia Corporation, Tokyo (JP)

(72) Inventors: Kazutaka Takizawa, Yokohama Kanagawa (JP); Yuki Kamijo, Yokohama Kanagawa (JP); Takehiko Amaki, Yokohama Kanagawa (JP); Shohei Asami, Yokohama Kanagawa (JP); Shunichi Igahara, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/882,292

(22) Filed: Sep. 11, 2024

(65) Prior Publication Data
US 2025/0130938 A1    Apr. 24, 2025

(30) Foreign Application Priority Data

Oct. 18, 2023  (JP) .................................. 2023-179641

(51) Int. Cl.
*G06F 12/02*    (2006.01)
(52) U.S. Cl.
CPC ................................ *G06F 12/0246* (2013.01)
(58) Field of Classification Search
None
See application file for complete search history.

(56) References Cited

U.S. PATENT DOCUMENTS

| 10,803,930 B2 | 10/2020 | Kiyooka et al. |
| 2022/0100413 A1 | 3/2022 | Kim |
| 2022/0262450 A1 | 8/2022 | Kim |
| 2022/0351784 A1 | 11/2022 | Bedeschi et al. |

FOREIGN PATENT DOCUMENTS

JP    2019-168813 A    10/2019

*Primary Examiner* — Kevin Verbrugge
(74) *Attorney, Agent, or Firm* — Foley & Lardner LLP

(57) ABSTRACT

A memory system according to one embodiment includes a memory device and a memory controller. The memory device includes memory cells. The memory controller executes a tracking operation. In the tracking operation, the memory controller is configured to cause the memory device to execute a plurality of times of read operations using a plurality of read levels. In the tracking operation, the memory controller is further configured to set a first voltage difference between two adjacent read levels of the read levels in a fourth voltage range lower than a first voltage in a third voltage range and a second voltage difference between two adjacent read levels of the read levels in a fifth voltage range higher than the first voltage in the third voltage range. The first and second voltage differences are different from each other.

20 Claims, 26 Drawing Sheets

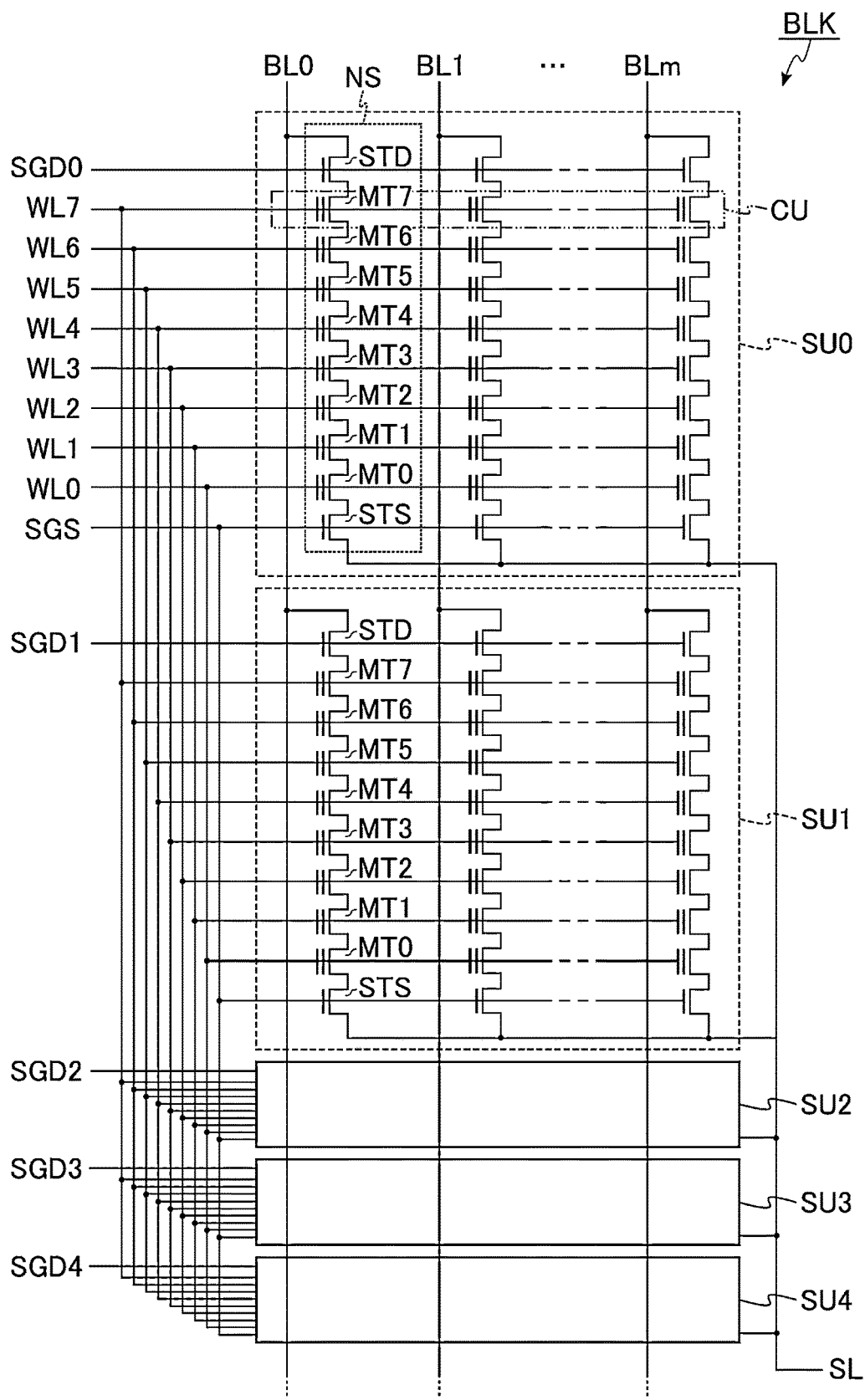
F I G. 4

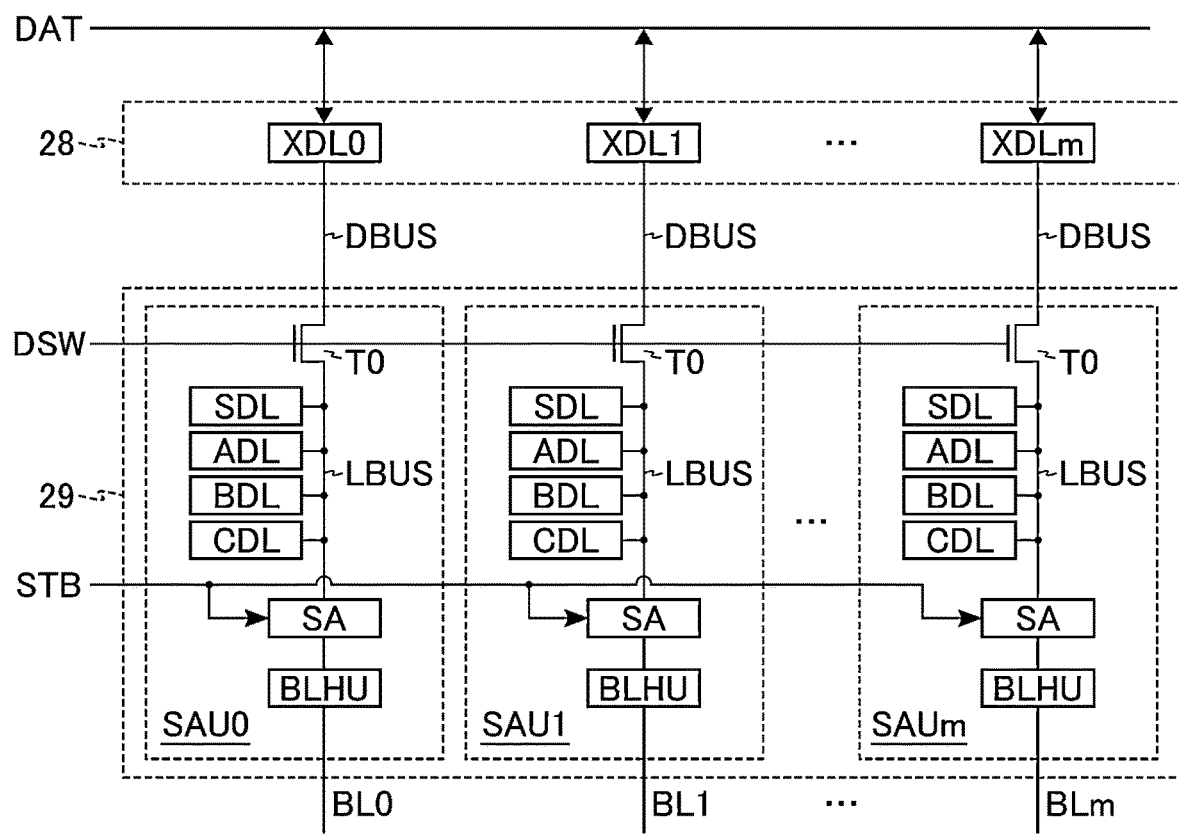
F I G. 6

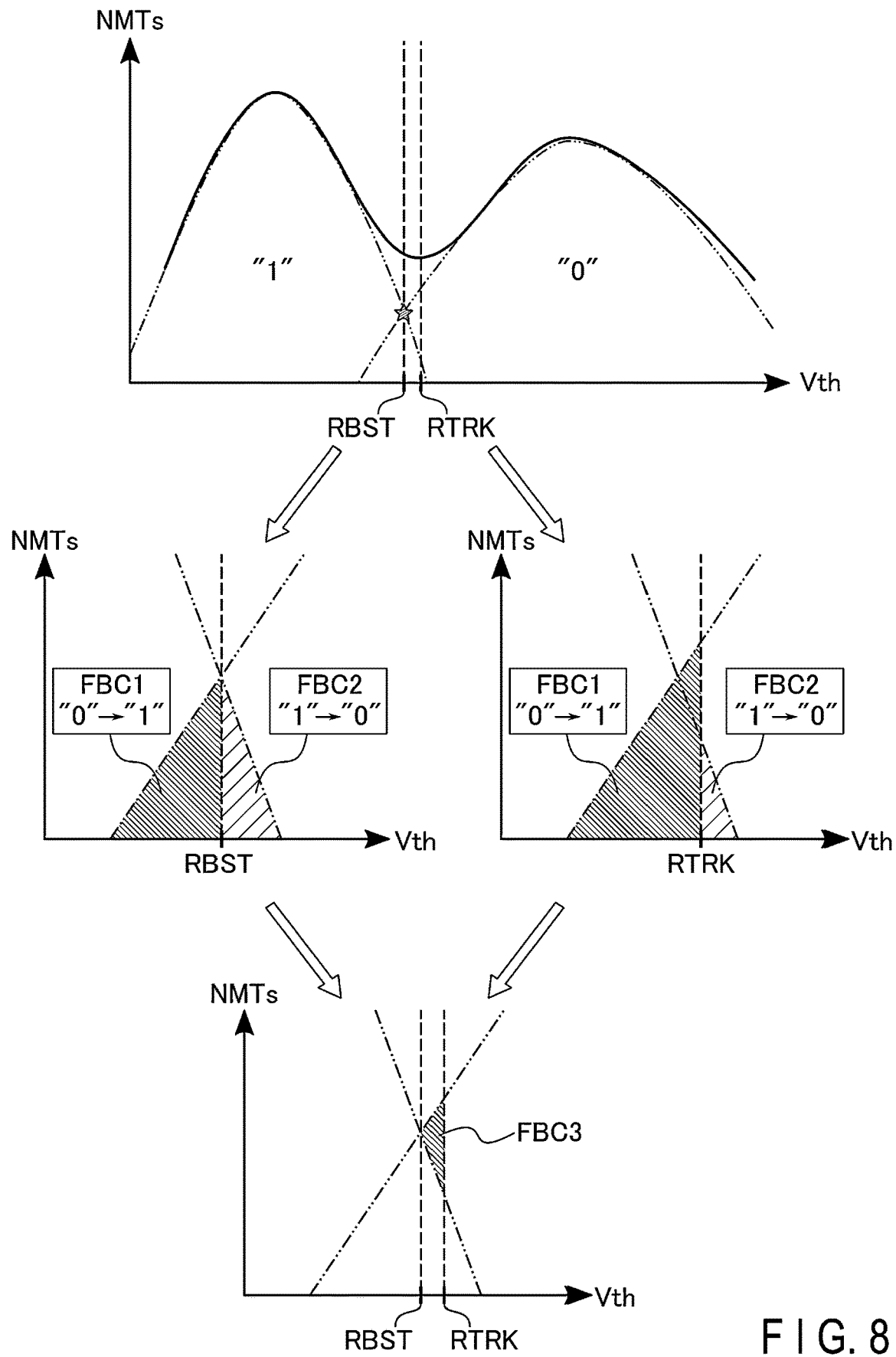
F I G. 8

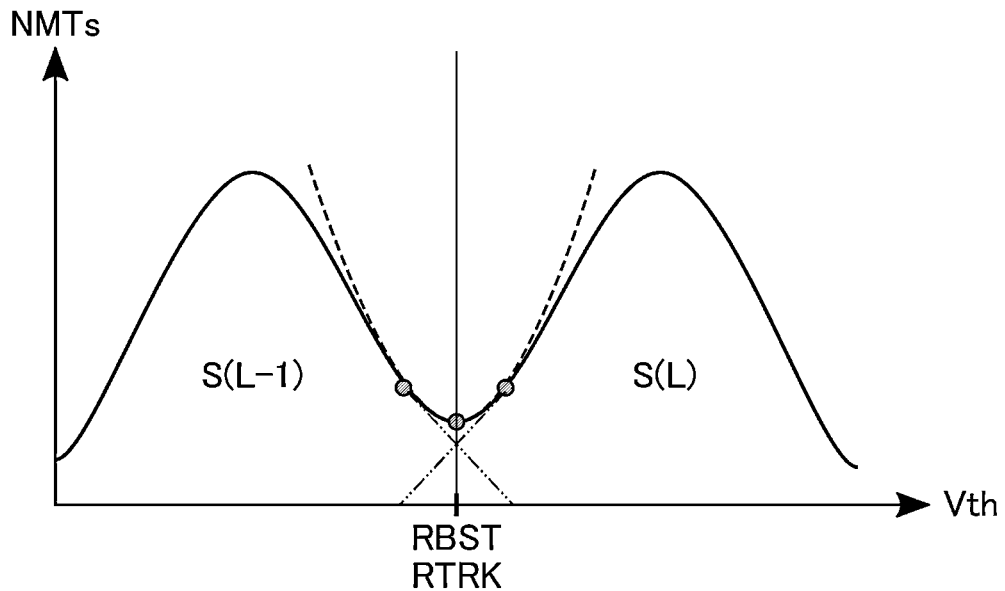
F I G. 9
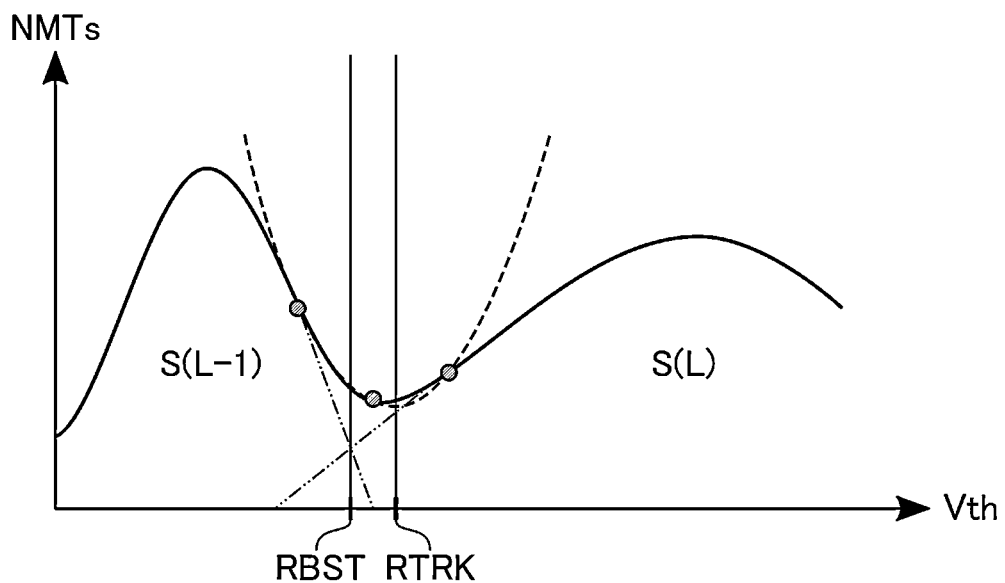
F I G. 10

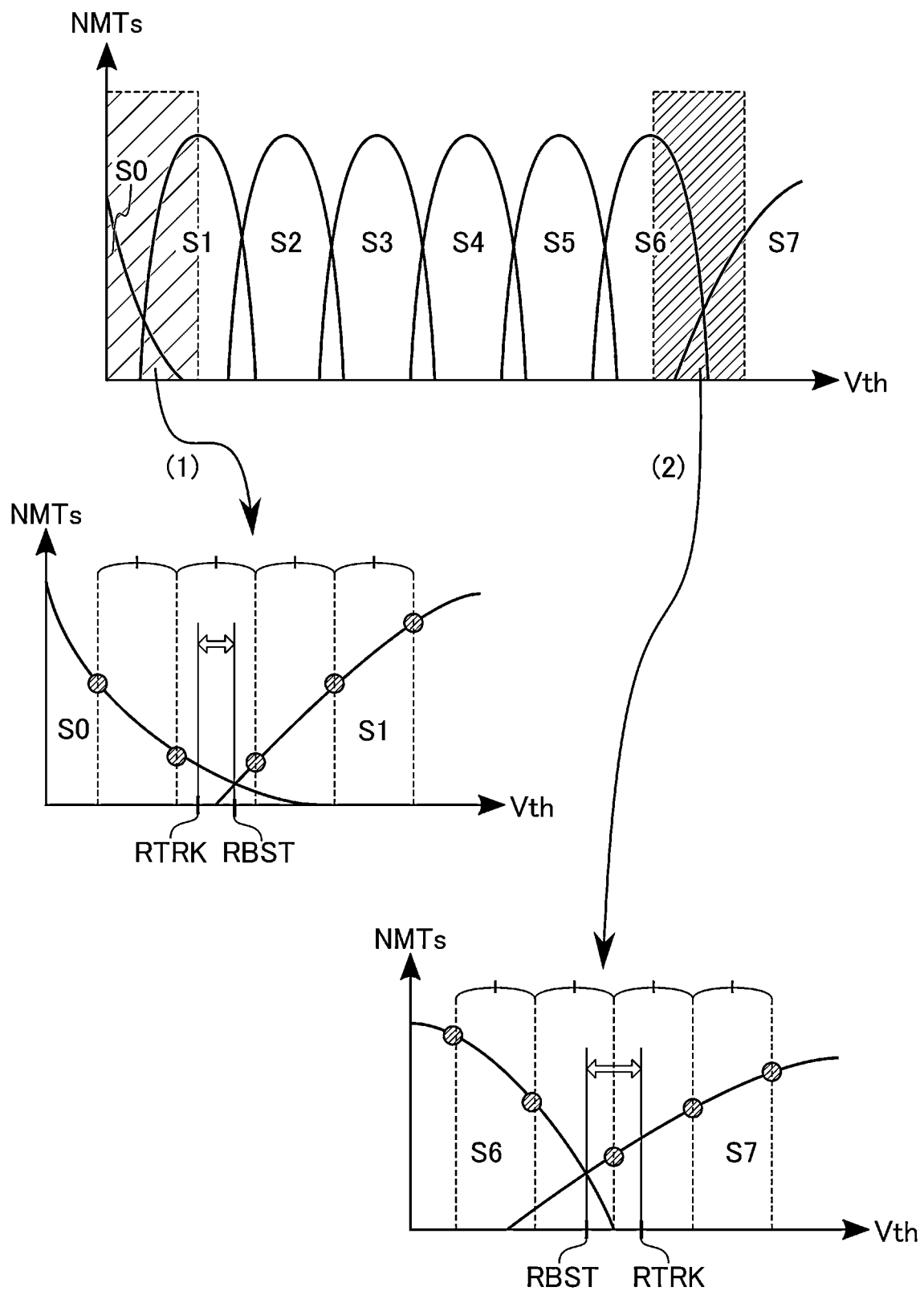
F I G. 11

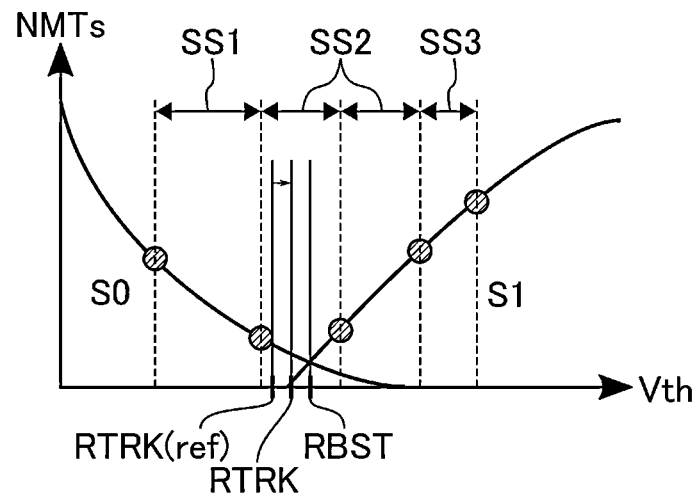
F I G. 13
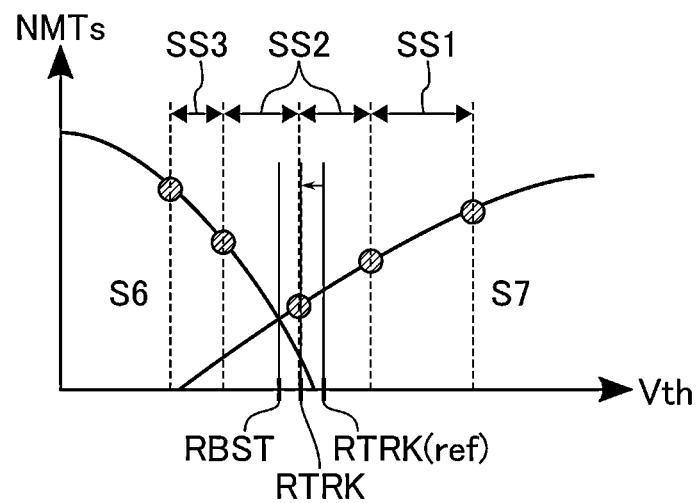
F I G. 14

| Index value | Start read level [V] | | | | |
|---|---|---|---|---|---|
| | S0-S1 | S1-S2 | ... | S5-S6 | S6-S7 |
| #0 | RL1_0 | RL2_0 | ... | RL6_0 | RL7_0 |
| #1 | RL1_1 | RL2_1 | ... | RL6_1 | RL7_1 |
| #2 | RL1_2 | RL2_2 | ... | RL6_2 | RL7_2 |
| #3 | RL1_3 | RL2_3 | ... | RL6_3 | RL7_3 |
| #4 | RL1_4 | RL2_4 | ... | RL6_4 | RL7_4 |
F I G. 16
| Index value | Step value [DAC] | | | |
|---|---|---|---|---|
| | S0-S1 | S1-S2 | ... | S6-S7 |
| #0 | SS1a_0,SS1b_0, SS1c_0,SS1d_0 | SS2a_0,SS2b_0, SS2c_0,SS2d_0 | ... | SS7a_0,SS7b_0, SS7c_0,SS7d_0 |
| #1 | SS1a_1,SS1b_1, SS1c_1,SS1d_1 | SS2a_1,SS2b_1, SS2c_1,SS2d_1 | ... | SS7a_1,SS7b_1, SS7c_1,SS7d_1 |
| #2 | SS1a_2,SS1b_2, SS1c_2,SS1d_2 | SS2a_2,SS2b_2, SS2c_2,SS2d_2 | ... | SS7a_2,SS7b_2, SS7c_2,SS7d_2 |
| #3 | SS1a_3,SS1b_3, SS1c_3,SS1d_3 | SS2a_3,SS2b_3, SS2c_3,SS2d_3 | ... | SS7a_3,SS7b_3, SS7c_3,SS7d_3 |
| #4 | SS1a_4,SS1b_4, SS1c_4,SS1d_4 | SS2a_4,SS2b_4, SS2c_4,SS2d_4 | ... | SS7a_4,SS7b_4, SS7c_4,SS7d_4 |
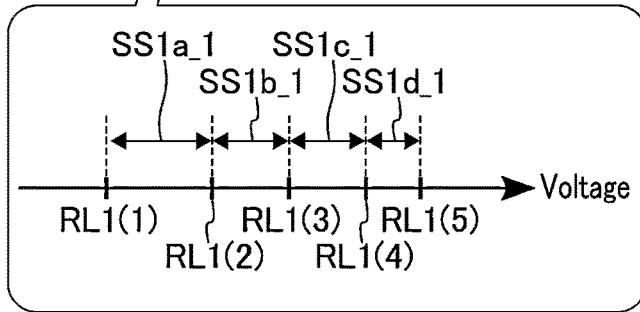
F I G. 17

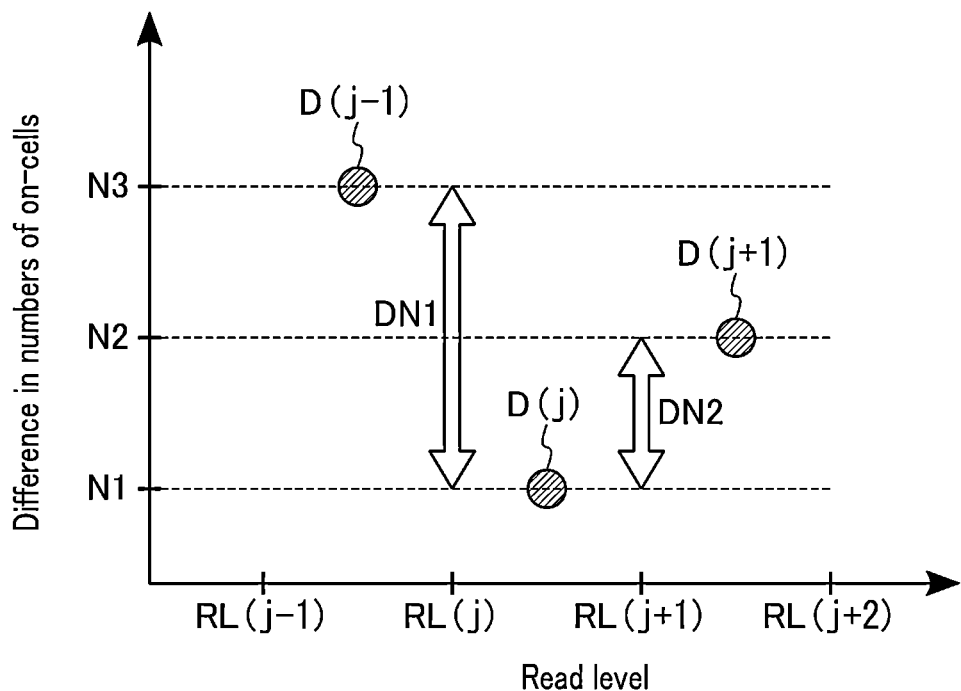
F I G. 19
| Command set name | Command sequence |
|---|---|
| CS1 | aah-ADD(LUN)-ADD(AAh)-DAT1-(tFEAT) |
| CS2 | 01h/02h/03h-00h-ADD(CUsel)-30h-(tR) |
| CS3 | bbh-ADD(CUsel)-E0h => Data-out |
F I G. 20

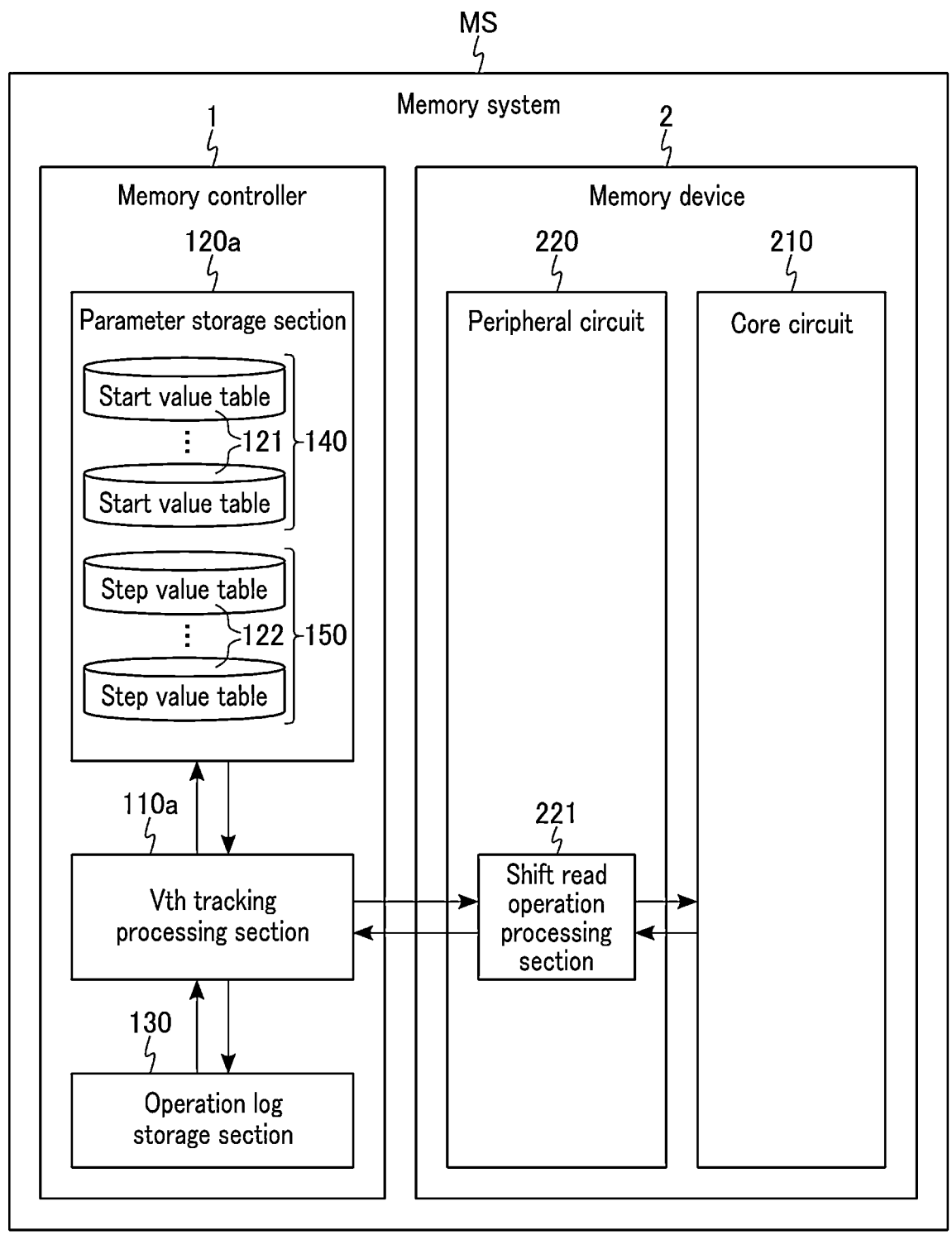
F I G. 22

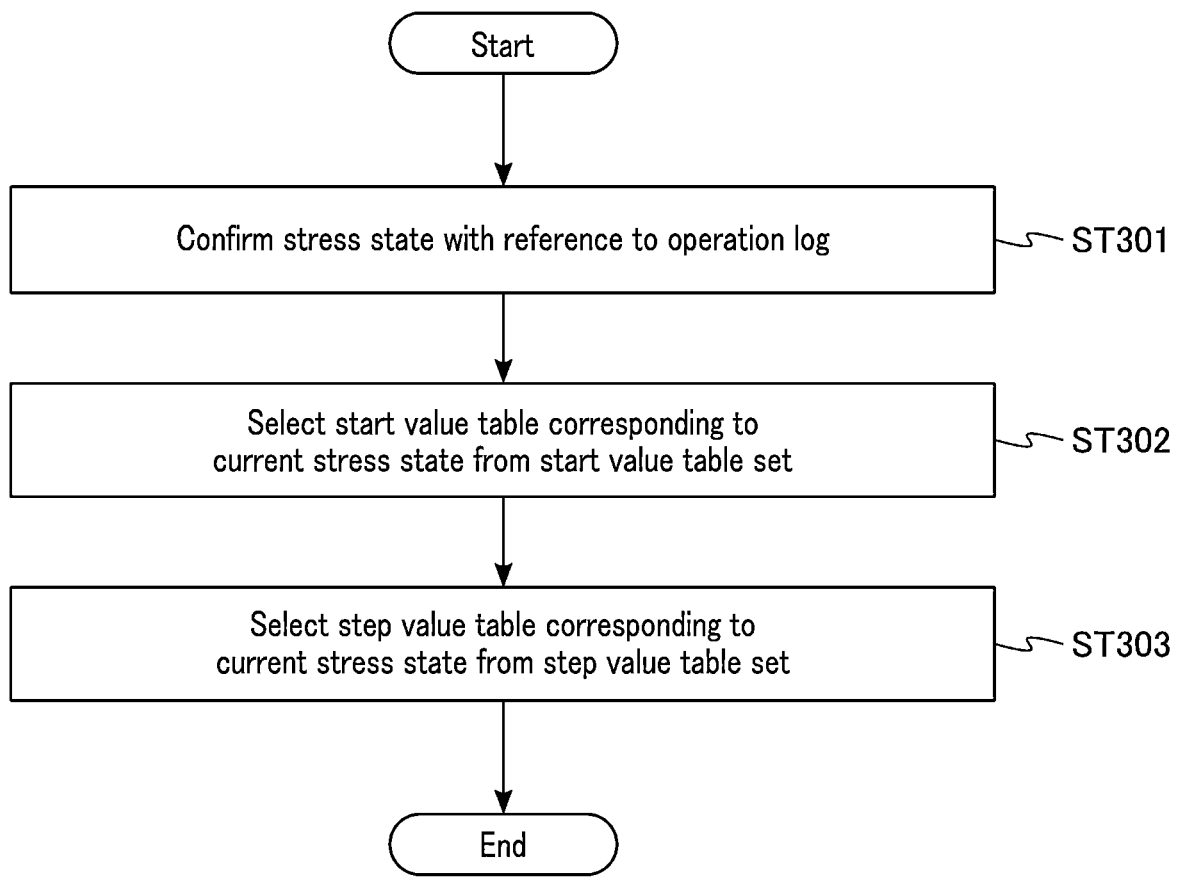
F I G. 23

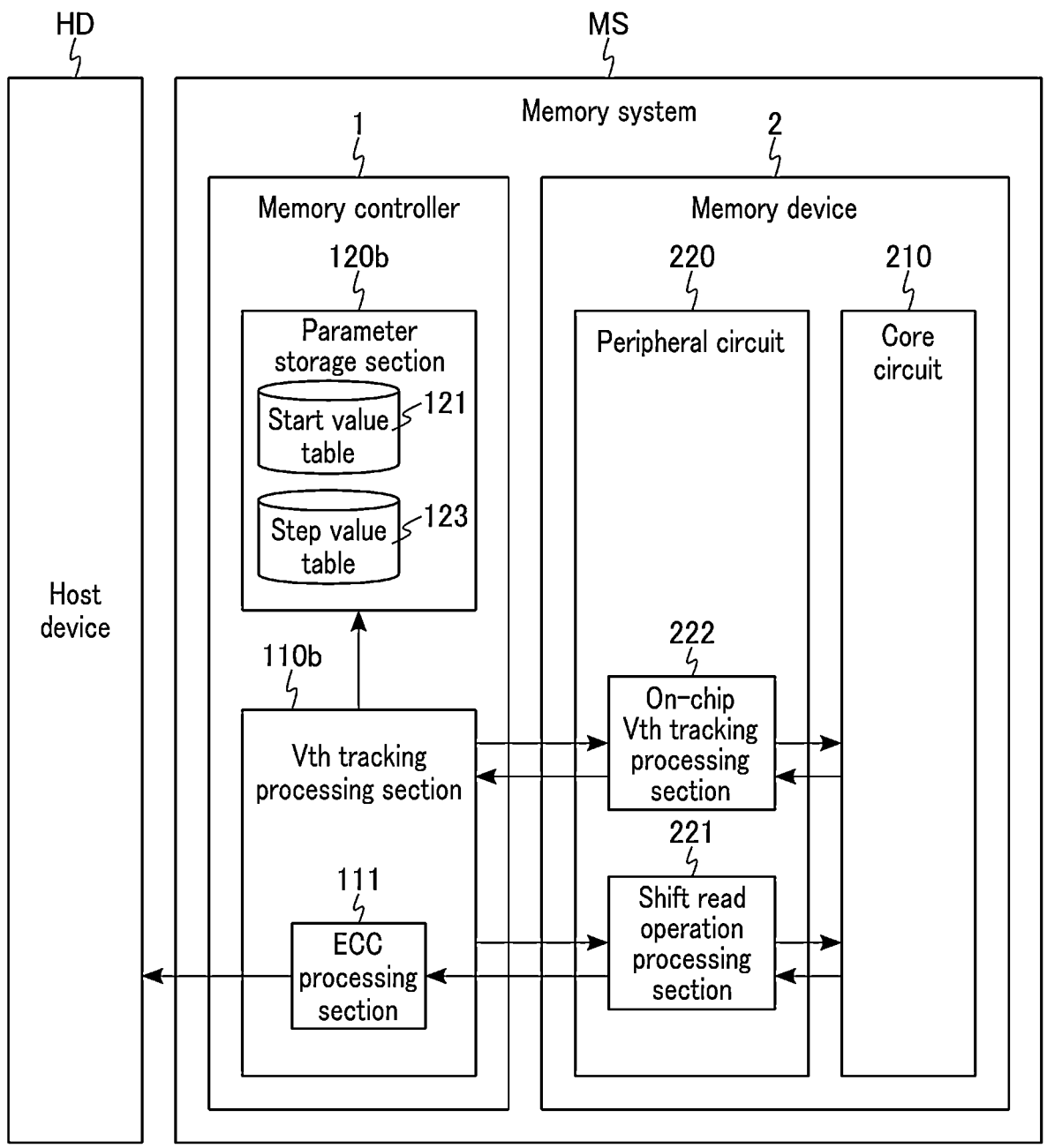
F I G. 24

| Index value | Step value SS[DAC] | | | | | | | | | |
|---|---|---|---|---|---|---|---|---|---|---|
| | S0–S1 | | S1–S2 | | S2–S3 S3–S4 S4–S5 | | S5–S6 | | S6–S7 | |
| | SSa | SSb | SSa | SSb | SSa | SSb | SSa | SSb | SSa | SSb |
| #0 | 8 | 8 | 8 | 8 | n/a | n/a | 8 | 8 | 8 | 8 |
| #1 | 8 | 4 | 8 | 8 | n/a | n/a | 8 | 8 | 4 | 8 |
| #2 | 8 | 4 | 8 | 4 | n/a | n/a | 4 | 8 | 4 | 8 |
| #3 | 16 | 4 | 8 | 4 | n/a | n/a | 4 | 16 | 4 | 8 |
| #4 | 16 | 4 | 16 | 4 | n/a | n/a | 4 | 16 | 4 | 16 |

F I G. 25

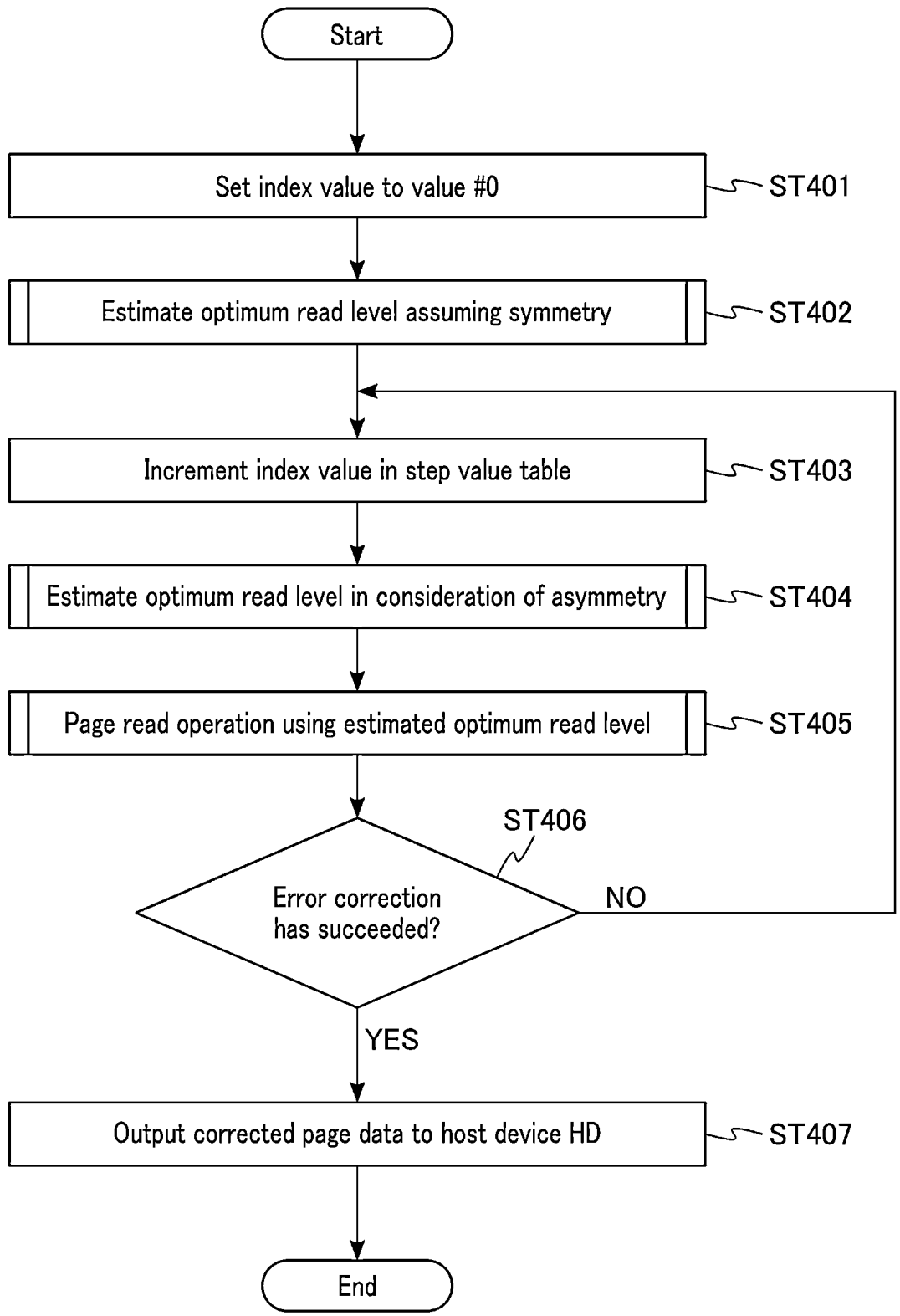
F I G. 26

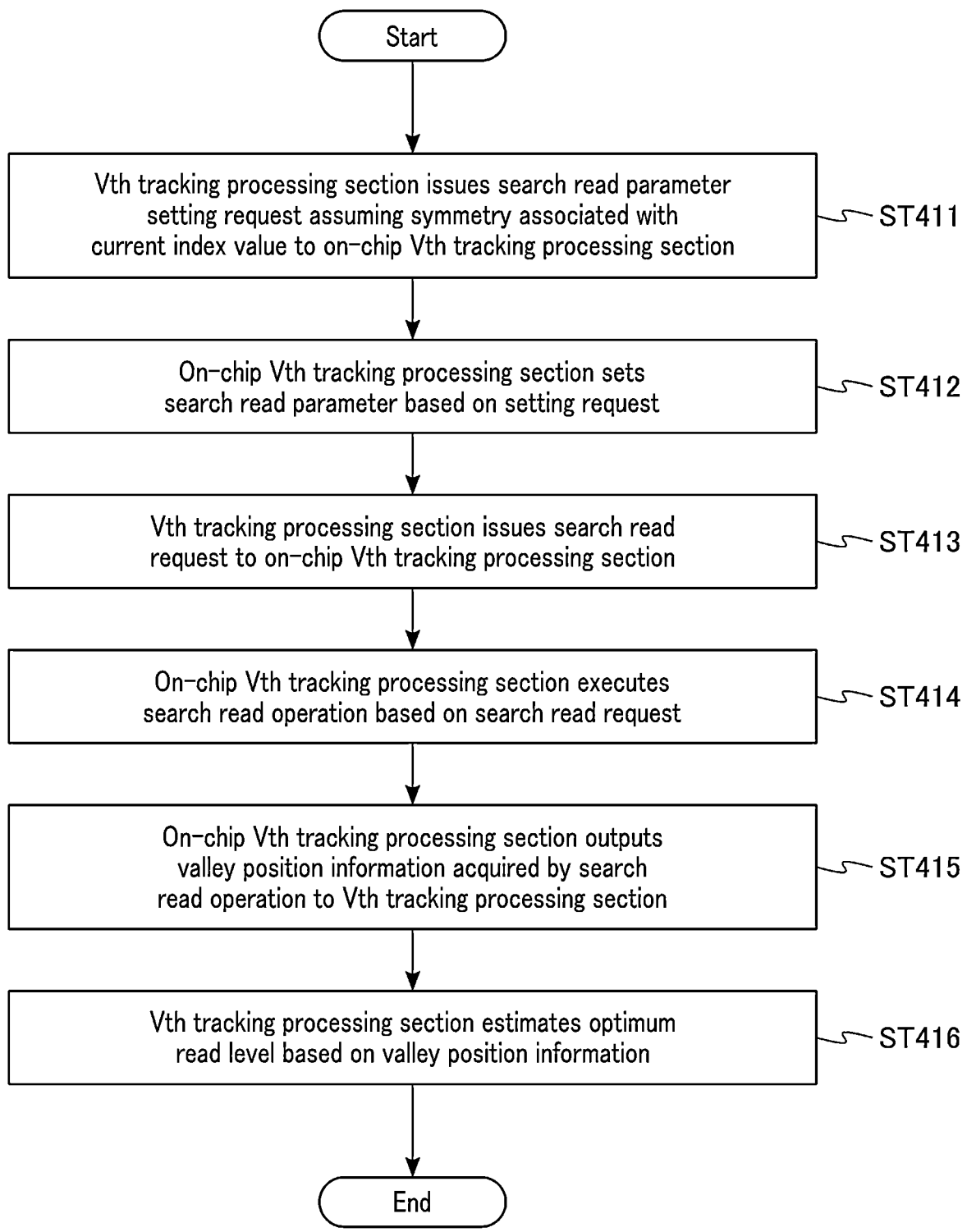
F I G. 27

| Command set name | Command sequence |
|---|---|
| CS4 | cch-ADD(LUN)-ADD(BBh)-DAT2-(tFEAT) |
| CS5 | cch-ADD(LUN)-ADD(CCh)-DAT3-(tFEAT) |
| CS6 | cch-ADD(LUN)-ADD(DDh)-DAT4-(tFEAT) |
| CS7 | ddh-01h/02h/03h-ADD(CUsel)-30h-(tR) |
| CS8 | eeh-ADD(EEh)-(DataOutput) |
F I G. 30
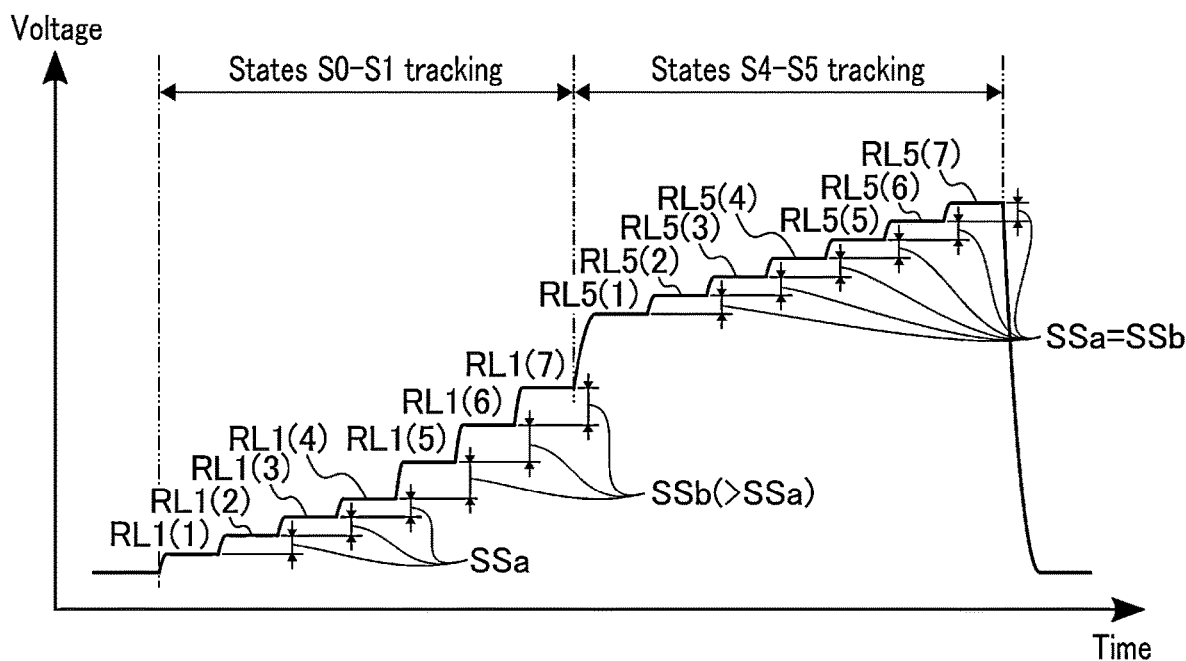
F I G. 31

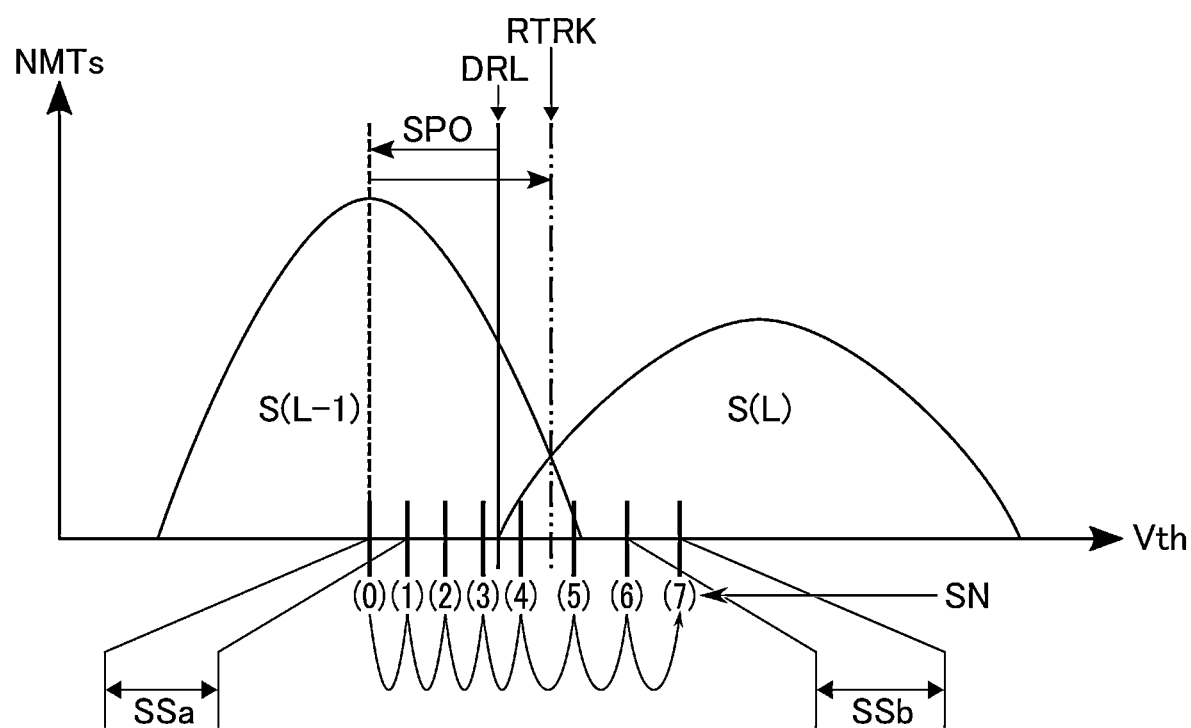
F I G. 32

MEMORY SYSTEM AND MEMORY DEVICE

CROSS-REFERENCE TO RELATED APPLICATION

This application is based upon and claims the benefit of priority from Japanese Patent Application No. 2023-179641, filed Oct. 18, 2023, the entire contents of which are incorporated herein by reference.

FIELD

Embodiments described herein relate generally to a memory system and a memory device.

BACKGROUND

A NAND flash memory capable of storing data in a non-volatile manner is known.

BRIEF DESCRIPTION OF THE DRAWINGS

FIG. 4 is a diagram illustrating an example of a circuit configuration of a memory cell array included in the memory system according to the first embodiment.

FIG. 6 is a diagram illustrating an example of a circuit configuration of a sense amplifier module and a data register included in the memory system according to the first embodiment.

FIG. 8 is a schematic diagram illustrating an example of a fail bit count in adjacent states in the memory system according to the first embodiment.

FIG. 9 is a schematic diagram illustrating an example of symmetric threshold voltage distribution of adjacent states in the memory system according to the first embodiment.

FIG. 10 is a schematic diagram illustrating an example of asymmetric threshold voltage distribution of adjacent states in the memory system according to the first embodiment.

FIG. 11 is a schematic diagram illustrating an example of more detailed threshold voltage distribution of the memory cell transistor according to the first embodiment.

FIG. 13 is a schematic diagram illustrating an example of a method of setting a step value used in Vth tracking executed in the memory system according to the first embodiment.

FIG. 14 is a schematic diagram illustrating another example of a method of setting a step value used in Vth tracking executed in the memory system according to the first embodiment.

FIG. 16 is a diagram illustrating an example of a start value table included in the memory system according to the second embodiment.

FIG. 17 is a diagram illustrating an example of a step value table included in the memory system according to the second embodiment.

FIG. 19 is a schematic diagram illustrating a specific example of a part of processing of Vth tracking executed in the memory system according to the second embodiment.

FIG. 20 is a table illustrating an example of a command sequence used in the memory system according to the second embodiment.

FIG. 22 is a block diagram illustrating an example of a functional configuration of a memory system according to a third embodiment.

FIG. 23 is a flowchart illustrating an example of a procedure of setting initial parameters of Vth tracking executed in the memory system according to the third embodiment.

FIG. 24 is a block diagram illustrating an example of a functional configuration of a memory system according to a fourth embodiment.

FIG. 25 is a diagram illustrating an example of a step value table included in the memory system according to the fourth embodiment.

FIG. 26 is a flowchart illustrating an example of a procedure of Vth tracking executed in the memory system according to the fourth embodiment.

FIG. 27 is a flowchart illustrating an example of a detailed procedure of a part of processing of Vth tracking executed in the memory system according to the fourth embodiment.

FIG. 30 is a table illustrating an example of a command sequence used in the memory system according to the fourth embodiment.

FIG. 31 is a diagram illustrating a specific example of a voltage applied to a word line in a search read operation in the memory system according to the fourth embodiment.

FIG. 32 is a schematic diagram illustrating a specific example of processing of determining an optimum read level in a search read operation in the memory system according to the fourth embodiment.

DETAILED DESCRIPTION

Figure 1:
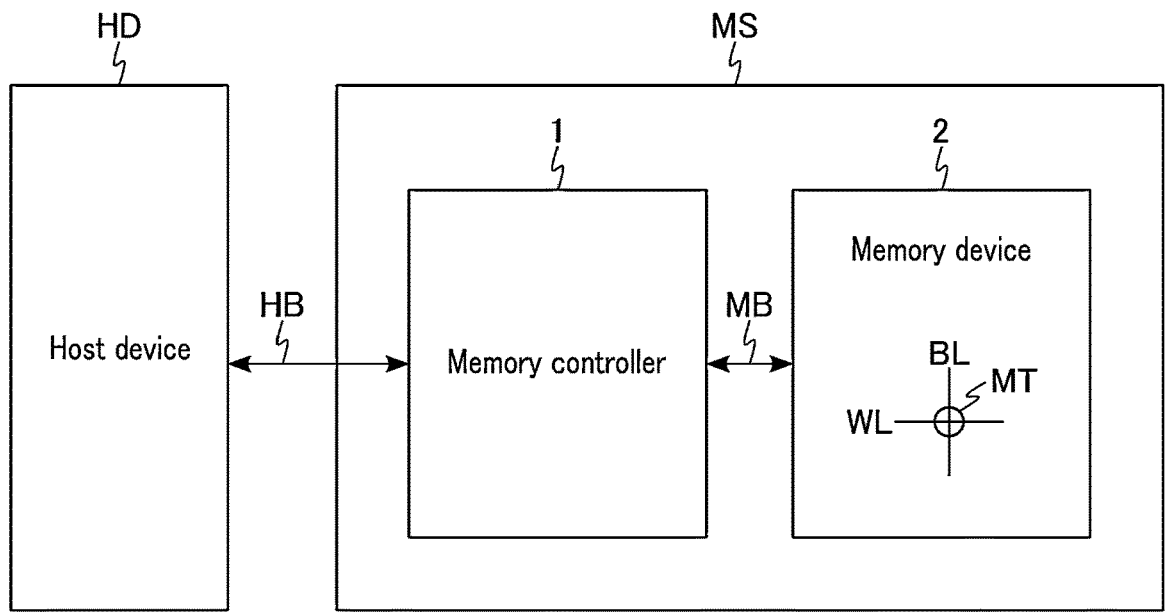
FIG. 1 is a block diagram illustrating an example of a configuration of a memory system according to a first embodiment.

In general, according to one embodiment, a memory system includes a memory device and a memory controller. The memory device includes a plurality of memory cells, each of the plurality of memory cells being configured to non-volatilely store data including at least a first value or a second value according to a threshold voltage thereof, the first value corresponding to the threshold voltage included in a first voltage range, and the second value corresponding to the threshold voltage included in a second voltage range different from the first voltage range. The memory controller is electrically connected to the memory device and configured to: write data of the first value to each of a plurality of first memory cells among the plurality of memory cells; write data of the second value to each of a plurality of second memory cells among the plurality of memory cells; determine a first voltage based on information related to a gradient of distribution of the threshold voltage of each of the plurality of memory cells; and execute a tracking operation. In the tracking operation, the memory controller is configured to: cause the memory device to execute a plurality of times of read operations on the plurality of memory cells, using a plurality of read levels in a third voltage range, the third voltage range including at least a part of the first voltage range and at least a part of the second voltage range; and acquire the number of on-cells that are memory cells having been turned on among the plurality of memory cells in each of the read operations. In the tracking operation, the memory controller is further configured to: set a first voltage difference, the first voltage difference being a difference between two adjacent read levels of the plurality of read levels in a fourth voltage range that is lower than the first voltage in the third voltage range; and set a second voltage difference to be different from the first voltage difference, the second voltage difference being a difference between two adjacent read levels of the plurality of read levels in a fifth voltage range that is higher than the first voltage in the third voltage range.

Hereinafter, embodiments will be described with reference to the drawings. The embodiments will exemplify apparatuses and methods for embodying the technical idea of the invention. The drawings are schematic or conceptual. The illustration of the configuration is omitted as appropriate. Components having substantially the same functions and configurations are denoted by the same reference numerals. Numbers and the like added to reference numerals are referred to by the same reference numerals and are used to distinguish between similar components.

<1> First Embodiment

A first embodiment relates to a memory system MS using a NAND flash memory capable of storing data in a non-volatile manner. The memory system MS according to the first embodiment is configured to be able to execute Vth tracking in which a plurality of step sizes different from each other can be set. Hereinafter, details of the memory system MS according to the first embodiment will be described.

<1-1> Configuration

First, a configuration of the memory system MS according to the first embodiment will be described.
<1-1-1> Configuration of Memory System MS
FIG. 1 is a block diagram illustrating an example of a configuration of the memory system MS according to the first embodiment. As illustrated in FIG. 1, the memory system MS can be coupled to an external host device HD (also referred to as a host). The host device HD is an electronic device, such as a personal computer, a personal digital assistant, or a server. The memory system MS is a storage device, such as a memory card or a solid state drive (SSD). The memory system MS includes, for example, a memory controller 1 and at least one memory device 2.

The memory controller 1 is, for example, a semiconductor integrated circuit configured as a system-on-a-chip (SoC), an application specific integrated circuit (ASIC), or a field-programmable gate array (FPGA). The memory controller 1 has a function of managing and controlling the memory device 2. The memory controller 1 is configured to be coupled to the host device HD via a host bus HB. The memory controller 1 is coupled to the memory device 2 via a memory bus MB. The memory controller 1 can control the memory device 2 based on a request received from the host device HD. For example, the memory controller 1 can control the memory device 2 to execute a read operation, a write operation, an erase operation, and the like.

The memory device 2 is a semiconductor memory device configured to store data in a non-volatile manner. The memory device 2 is, for example, a NAND flash memory. In the NAND flash memory, a unit of a data read operation and a data write operation is referred to as a page. The memory device 2 includes a plurality of memory cell transistors MT, a plurality of bit lines BL, and a plurality of word lines WL. For example, each memory cell transistor MT is associated with one bit line BL and one word line WL. A column address is assigned to each of the bit lines BL. A page address is assigned to each of the word lines WL.

Figure 2:
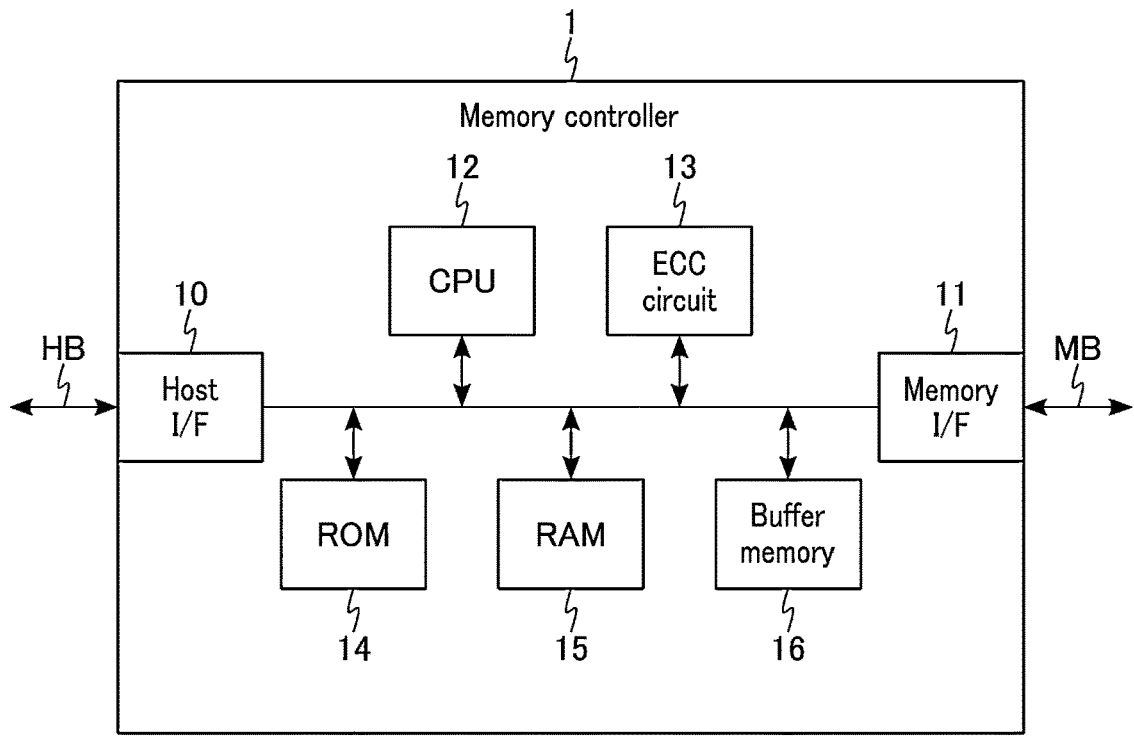
FIG. 2 is a block diagram illustrating an example of a hardware configuration of a memory controller included in the memory system according to the first embodiment.

Note that the memory controller 1 and at least one memory device 2 may be configured as one semiconductor device.
<1-1-2> Hardware Configuration of Memory Controller 1
FIG. 2 is a block diagram illustrating an example of a hardware configuration of the memory controller 1 included in the memory system MS according to the first embodiment. As illustrated in FIG. 2, the memory controller 1 includes, for example, a host interface circuit (host I/F) 10, a memory interface circuit (memory I/F) 11, a central processing unit (CPU) 12, an error correction code (ECC) circuit 13, a read only memory (ROM) 14, a random access memory (RAM) 15, and a buffer memory 16. The host I/F 10, the memory I/F 11, the CPU 12, the ECC circuit 13, the ROM 14, the RAM 15, and the buffer memory 16 may be coupled to an internal bus.

The host I/F 10 controls communication conforming to an interface specification between the host device HD and the memory controller 1. The host I/F 10 is configured to be coupled to the host device HD via the host bus HB. The host I/F 10 supports an interface specification such as Serial Advanced Technology Attachment (SATA), Serial Attached SCSI (SAS), PCI Express (PCIe™), and Non-Volatile Memory Express™ (NVMe™).

The memory I/F 11 controls communication conforming to an interface specification between the memory controller 1 and the memory device 2. The memory I/F 11 is coupled to the memory device 2 via the memory bus MB. The memory I/F 11 supports an interface specification such as Toggle DDR and Open NAND Flash Interface (ONFI).

The CPU 12 is a processor that controls the overall operation of the memory controller 1. The CPU 12 instructs the memory device 2 to execute a data write operation via the memory I/F 11 in accordance with a write request received via the host I/F 10. The CPU 12 instructs the memory device 2 to execute a data read operation via the memory I/F 11 in accordance with a read request received via the host I/F 10.

The ECC circuit 13 is a circuit that executes ECC processing. The ECC processing includes data coding and decoding. The ECC circuit 13 encodes data to be written in the memory device 2, and decodes data read out from the memory device 2.

The ROM 14 is a non-volatile memory. The ROM 14 stores, for example, a program such as firmware. The ROM 14 is, for example, an electrically erasable programmable read-only memory (EEPROM™). The CPU 12 executes various processing by executing firmware stored in the ROM 14 or the like.

The RAM 15 is a volatile memory. The RAM 15 is used as a work area of the CPU 12. The RAM 15 is, for example, a static random access memory (SRAM) or a dynamic random access memory (DRAM).

The buffer memory 16 is, for example, a volatile memory. The buffer memory 16 temporarily stores data received via the host I/F 10, data received via the memory I/F 11, or the like. The buffer memory 16 is, for example, a DRAM or an SRAM. The buffer memory 16 may be mounted on an outside of the memory controller 1.

<1-1-3> Hardware Configuration of Memory Device 2

Figure 3:
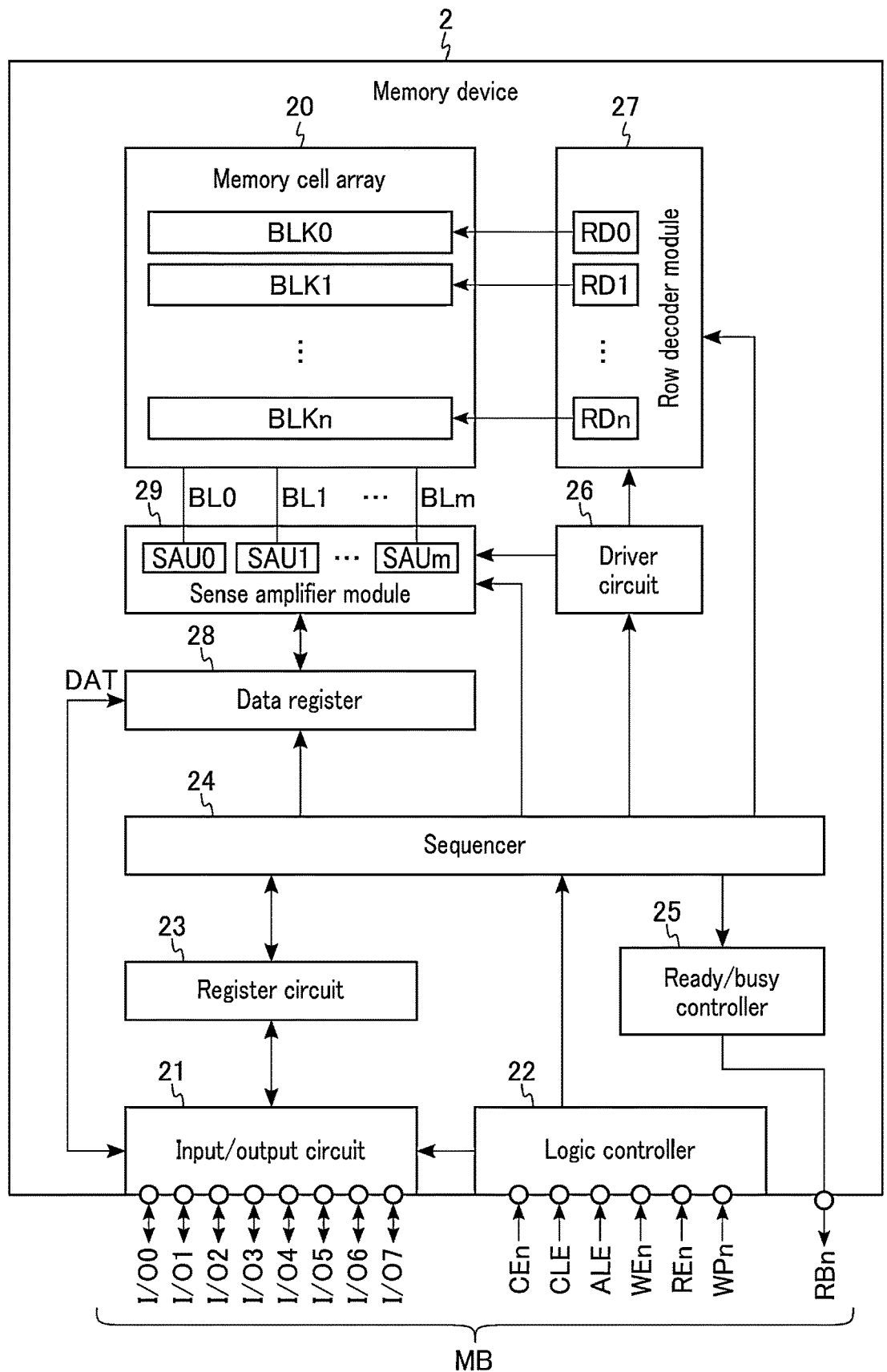
FIG. 3 is a block diagram illustrating an example of a hardware configuration of a memory device included in the memory system according to the first embodiment.

FIG. 3 is a block diagram illustrating an example of a configuration of the memory device 2 included in the memory system MS according to the first embodiment. As illustrated in FIG. 3, the memory device 2 includes, for example, a memory cell array 20, an input/output circuit 21, a logic controller 22, a register circuit 23, a sequencer 24, a ready/busy controller 25, a driver circuit 26, a row decoder module 27, a data register 28, and a sense amplifier module 29. Signals transmitted and received via the memory bus MB include, for example, input/output signals I/O0 to I/O7, control signals CEn, CLE, ALE, WEn, REn, and WPn, and a ready/busy signal RBn.

The memory cell array 20 is a set of the memory cell transistors MT. The memory cell array 20 includes a plurality of blocks BLK0 to BLKn ("n" is an integer of 1 or larger). The block BLK is, for example, a unit of data erase operation. A block address is assigned to each of the blocks BLK. The memory cell array 20 is provided with a plurality of bit lines BL0 to BLm ("m" is an integer of 1 or larger) and a plurality of word lines WL (not illustrated).

The input/output circuit 21 controls transmission and reception (input/output) of the input/output signals I/O0 to I/O7. The input/output signal I/O can include, for example, data DAT, status information, an address, and a command. The input/output circuit 21 can input and output the data DAT between the data register 28 and the memory controller 1. The input/output circuit 21 can output the status information transferred from the register circuit 23 to the memory controller 1. The input/output circuit 21 can output each of the address and the command transferred from the memory controller 1 to the register circuit 23.

The logic controller 22 controls each of the input/output circuit 21 and the sequencer 24 based on each control signal input from the memory controller 1. The logic controller 22 enables the memory device 2 based on the control signal CEn. The logic controller 22 notifies the input/output circuit 21 that the input/output signals I/O received by the memory device 2 are the command and the address, respectively, based on the control signals CLE and ALE. The logic controller 22 instructs the input/output circuit 21 to receive the input/output signal I/O based on the control signal WEn, and instructs the input/output circuit 21 to transmit the input/output signal I/O based on the control signal REn. The logic controller 22 brings the memory device 2 into a protection state based on the control signal WPn.

The register circuit 23 temporarily stores status information, the address, the command, and the like. The status information indicates an operation state of the memory device 2. The status information is updated based on the control of the sequencer 24 and transferred to the memory controller 1 via the input/output circuit 21. The address may include a block address, a page address, a column address, and the like. The commands include instructions relating to various operations of the memory device 2.

The sequencer 24 is a controller that controls the overall operation of the memory device 2. The sequencer 24 executes a read operation, a write operation, an erase operation, etc. based on the command and the address stored in the register circuit 23.

The ready/busy controller 25 generates the ready/busy signal RBn under the control of the sequencer 24. The ready/busy signal RBn is a signal to notify the memory controller 1 of whether the memory device 2 is in a ready state or a busy state. The ready state is a state in which the memory device 2 can accept a command from the memory controller 1, and notified by the ready/busy signal RBn at a high-level. The busy state is a state in which the memory device 2 cannot accept a command from the memory controller 1, and notified by the ready/busy signal RBn at a low-level.

The driver circuit 26 generates voltages for use in a read operation, a write operation, an erase operation, etc. The driver circuit 26 supplies the generated voltages to the row decoder module 27 and the sense amplifier module 29.

The row decoder module 27 is a circuit for use in selecting a block BLK and supplying a voltage to interconnects, such as the word line WL. The row decoder module 27 includes a plurality of row decoders RD0 to RDn. The row decoders RD0 to RDn are associated with the blocks BLK0 to BLKn, respectively. Each of the row decoders RD can set the associated block BLK to be selected or unselected based on the block address.

The data register 28 is a circuit that temporarily stores the data DAT. The data register 28 may be used to input and output the data DAT between the input/output circuit 21 and the sense amplifier module 29. The data register 28 is also referred to as a data latch, a page register, or a cache memory.

The sense amplifier module 29 is a circuit for use in supplying a voltage to each bit line BL and reading data. The sense amplifier module 29 includes a plurality of sense amplifier units SAU0 to SAUm. The sense amplifier units SAU0 to SAUm are associated with the plurality of bit lines BL0 to BLm, respectively. Each of the sense amplifier units SAU may determine data read from a selected memory cell transistor MT based on the voltage of the associated bit line BL.

Note that a set of the memory cell array 20, the row decoder module 27, and the sense amplifier module 29 is also referred to as a plane, for example. The memory device 2 may include a plurality of planes. The sequencer 24 can be configured to be able to control each of the plurality of planes.

Hereinafter, an example of a detailed circuit configuration of the memory cell array 20, the row decoder module 27, the data register 28, and the sense amplifier module 29 will be described.

(1: Circuit Configuration of Memory Cell Array 20)

FIG. 4 is a diagram illustrating an example of a circuit configuration of the memory cell array 20 according to the first embodiment. FIG. 4 illustrates one of the plurality of blocks BLK included in the memory cell array 20. As illustrated in FIG. 4, the block BLK is provided with a plurality of bit lines BL0 to BLm, a plurality of word lines WL0 to WL7, select gate lines SGD0 to SGD4, a select gate line SGS, and a source line SL. The select gate lines SGD0 to SGD4 and SGS and the word lines WL0 to WL7 are provided for each block BLK. The bit lines BL0 to BLm are shared by a plurality of blocks BLK. The source line SL may be shared by a plurality of blocks BLK, or may be provided for each block BLK.

The block BLK includes, for example, five string units SU0 to SU4. Each string unit SU includes a plurality of NAND strings NS. The plurality of NAND strings NS are associated with the bit lines BL0 to BLm, respectively. That is, each bit line BL is shared by the NAND string NS to which the same column address is assigned among the plurality of blocks BLK. Each NAND string NS is coupled between the associated bit line BL and source line SL.

Each NAND string NS includes, for example, memory cell transistors MT0 to MT7 and select transistors STD and STS. Each memory cell transistor MT is a memory cell including a control gate and a charge storage layer, and holds (stores) data in a nonvolatile manner. The threshold voltage of the memory cell transistor MT can be changed based on the amount of charge injected into the charge storage layer or the like. The memory cell transistor MT stores data corresponding to the threshold voltage. Each of the select transistors STD and STS is used to select the string unit SU.

In each NAND string NS, the select transistor STD, the memory cell transistors MT7 to MT0, and the select transistor STS are coupled in series in this order. Specifically, the drain of the select transistor STD is coupled to the associated bit line BL. The source of the select transistor STD is coupled to the drain of the memory cell transistor MT7. The drain of the select transistor STS is coupled to the source of the memory cell transistor MT0. The source of the select transistor STS is coupled to the source line SL. The memory cell transistors MT0 to MT7 are coupled in series between the select transistors STD and STS.

The select gate lines SGD0 to SGD4 are associated with the string units SU0 to SU4, respectively. Each select gate line SGD is coupled to the gate of each of the plurality of select transistors STD included in the associated string unit SU. The select gate line SGS is coupled to the gate of each of the plurality of select transistors STS included in the associated block BLK. The word lines WL0 to WL7 are coupled to the control gates of the plurality of memory cell transistors MT0 to MT7 included in the associated block BLK, respectively.

In the present specification, a set of the plurality of memory cell transistors MT commonly coupled to the word line WL in one string unit SU is referred to as a cell unit CU. In the present specification, a set of 1-bit data stored in each of the plurality of memory cell transistors MT included in the cell unit CU is referred to as page data. The cell unit CU can store data of two or more pages according to the number of bits of data stored in each memory cell transistor MT.

The memory cell array 20 may have a circuit configuration other than the above. For example, the number of the string units SU included in each block BLK and the number of the memory cell transistors MT and the select transistors STD and STS included in each NAND string NS can be designed to any numbers.

(2: Circuit Configuration of Row Decoder Module 27)

Figure 5:
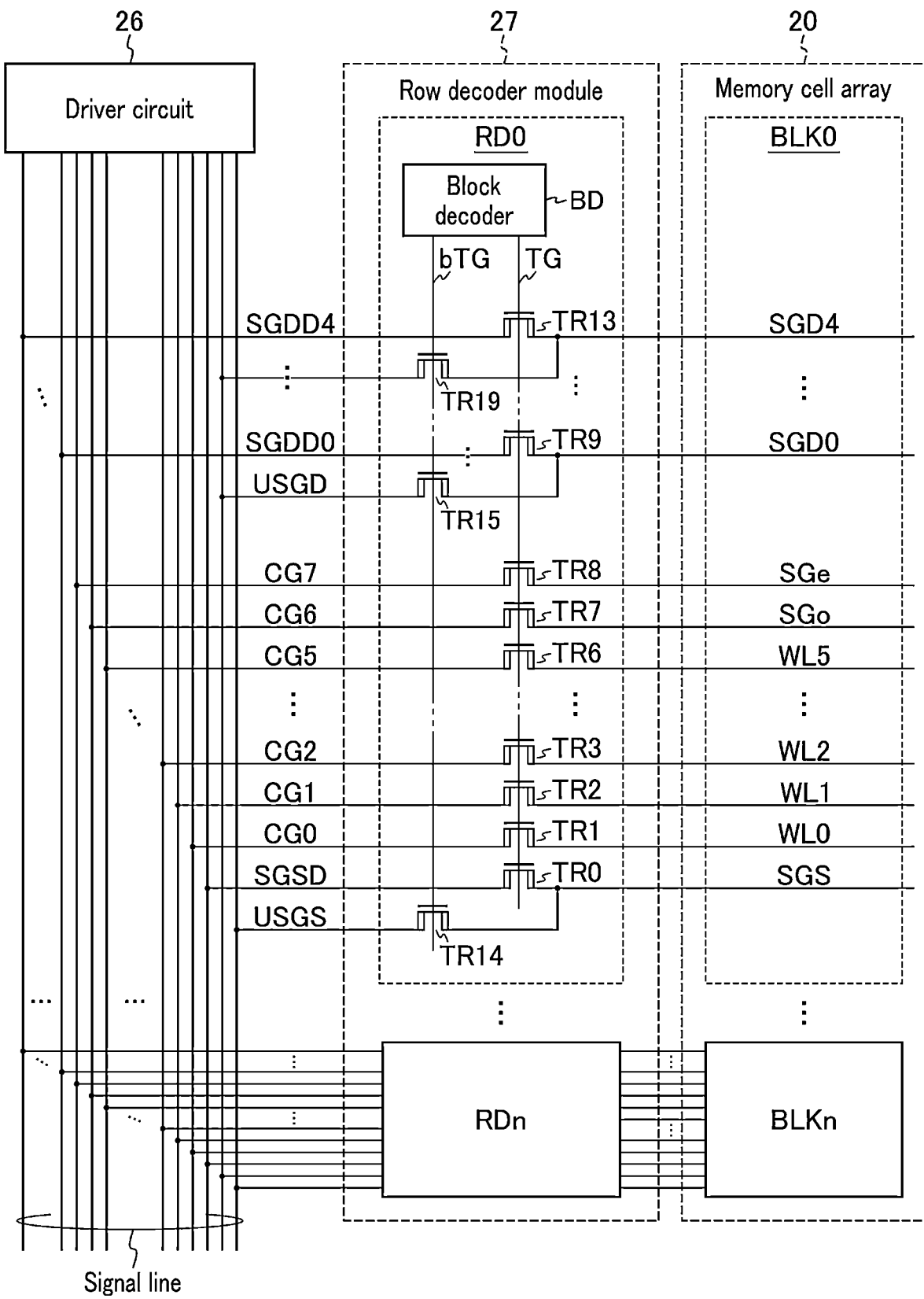
FIG. 5 is a diagram illustrating an example of a circuit configuration of a row decoder module included in the memory system according to the first embodiment.

FIG. 5 is a diagram illustrating an example of a circuit configuration of the row decoder module 27 according to the first embodiment. FIG. 5 illustrates a connectivity relationship between each of the driver circuit 26 and the memory cell array 20 and the row decoder module 27, and a detailed circuit configuration of one row decoder RD0. Note that the circuit configuration of the row decoder RD other than the row decoder RD0 is similar to that of the row decoder RD0. As illustrated in FIG. 5, each row decoder RD is coupled to signal lines CG0 to CG7, SGDD0 to SGDD4, SGSD, USGD, and USGS coupled to the driver circuit 26. In addition, each row decoder RD is coupled to the word lines WL0 to WL7 of the associated block BLK and the select gate lines SGD0 to SGD4 and SGS.

The row decoder RD0 includes, for example, transistors TR0 to TR19, transfer gate lines TG and bTG, and a block decoder BD. Each of the transistors TR0 to TR19 is an N-type high breakdown voltage transistor. The transfer gate line TG is coupled to the gates of the transistors TR0 to TR13. The transfer gate line bTG is coupled to the gates of the transistors TR14 to TR19. The drains of the transistors TR0 to TR13 are coupled to the signal lines SGSD, CG0 to CG7, and SGDD0 to SGDD4, respectively. Sources of the transistors TR0 to TR13 are coupled to the select gate line SGS, the word lines WL0 to WL7, and the select gate lines SGD0 to SGD4 of the block BLK0, respectively. The drain and the source of the transistor TR14 are coupled to the signal line USGS, and the select gate line SGS of the block BLK0, respectively. The drains of the transistors TR15 to TR19 are coupled to the signal line USGD. Sources of the transistors TR15 to TR19 are coupled to the select gate lines SGD0 to SGD4 of the block BLK0, respectively.

The block decoder BD is a circuit that decodes a block address. The block decoder BD applies one of a high level voltage and a low level voltage to the transfer gate line TG and applies the other of the high level voltage and the low level voltage to the transfer gate line bTG based on the block address decoding result. Specifically, the block decoder BD of the selected block BLK applies a high-level voltage to the transfer gate line TG and applies a low-level voltage to the transfer gate line bTG. The block decoder BD of the unselected block BLK applies a low-level voltage to the transfer gate line TG and applies a high-level voltage to the transfer gate line bTG. As a result, the voltages of the signal lines CG0 to CG7 are applied to the word lines WL0 to WL7 of the selected block BLK, respectively, the voltages of the signal lines SGDD0 to SGDD4 and SGSD are applied to the select gate lines SGD0 to SGD4 and SGS of the selected block BLK, respectively, and the voltages of the signal lines USGD and USGS are applied to the select gate lines SGD and SGS of the unselected block BLK, respectively.

Note that the row decoder module 27 may have a circuit configuration other than the above. For example, the number of transistors TR included in the row decoder module 27 can be appropriately changed according to the number of interconnects of each block BLK. Since the signal line CG is shared by the plurality of blocks BLK, the signal line CG is also referred to as a global word line. Since the word line WL is provided for each block, it is also referred to as a local word line. Since each of the signal lines SGDD and SGSD is shared by the plurality of blocks BLK, the signal lines SGDD and SGSD are also referred to as global transfer gate lines. Each of the select gate lines SGD and SGS is provided for each block, and thus is also referred to as a local transfer gate line.

(3: Circuit Configuration of Sense Amplifier Module 29 and Data Register 28)

FIG. 6 is a diagram illustrating an example of a circuit configuration of the sense amplifier module 29 and the data register 28 according to the first embodiment. As illustrated in FIG. 6, each sense amplifier unit SAU includes, for example, a bit line connection section BLHU, a sense amplifier section SA, buses DBUS and LBUS, latch circuits SDL, ADL, BDL and CDL, and a transistor TO. The data register 28 includes a plurality of latch circuits XDL0 to XDLm. The latch circuits XDL0 to XDLm are associated with the sense amplifier units SAU0 to SAUm, respectively. Each of the latch circuits XDL0 to XDLm is coupled to the associated sense amplifier unit SAU via the bus DBUS.

The bit line connection section BLHU is, for example, a protection circuit that prevents a high voltage applied to the channel of the NAND string NS in the erase operation from being applied to the sense amplifier section SA. The bit line connection section BLHU may be configured to be able to apply a predetermined voltage to the unselected bit lines BL.

The sense amplifier section SA is a circuit for use in determining data based on a voltage of the bit line BL and applying a voltage to the bit line BL. Each sense amplifier section SA is coupled to the associated bit line BL via the bit line connection section BLHU. When a control signal STB is asserted in a read operation, the sense amplifier section SA determines whether data read from the selected memory cell transistor MT is "0" or "1", based on the voltage of the associated bit line BL. The control signal STB is generated by, for example, the sequencer 24.

Each of the latch circuits SDL, ADL, BDL, and CDL can temporarily store data. The latch circuits SDL, ADL, BDL, and CDL are coupled to the sense amplifier section SA via the bus LBUS in such a manner that data can be transmitted and received.

The transistor TO of each sense amplifier unit SAU controls transfer of a signal between the associated buses DBUS and LBUS. One end of the transistor TO of each sense amplifier unit SAU is coupled to the associated bus DBUS. The other end of the transistor TO of each sense amplifier unit SAU is coupled to the associated bus LBUS. The control signal DSW is input to the gate of the transistor TO of each sense amplifier unit. The control signal DSW is generated by, for example, the sequencer 24.

Each of the latch circuits XDL can temporarily store data. Each of the latch circuits XDL is coupled to the associated sense amplifier unit SAU via the bus DBUS in such a manner that data can be transmitted and received. Each of the latch circuits XDL is used for the input/output of data DAT between the sense amplifier module 29 and the input/output circuit 21. Each of the latch circuits XDL may be shared by a plurality of sense amplifier units SAU.

Note that the sense amplifier module 29 may have a circuit configuration other than the above. For example, the number of latch circuits included in each sense amplifier unit SAU can be appropriately changed. Further, the sense amplifier unit SAU may include an arithmetic circuit capable of executing a logic operation.

<1-1-4> Threshold Voltage Distribution of Memory Cell Transistor MT

Figure 7:
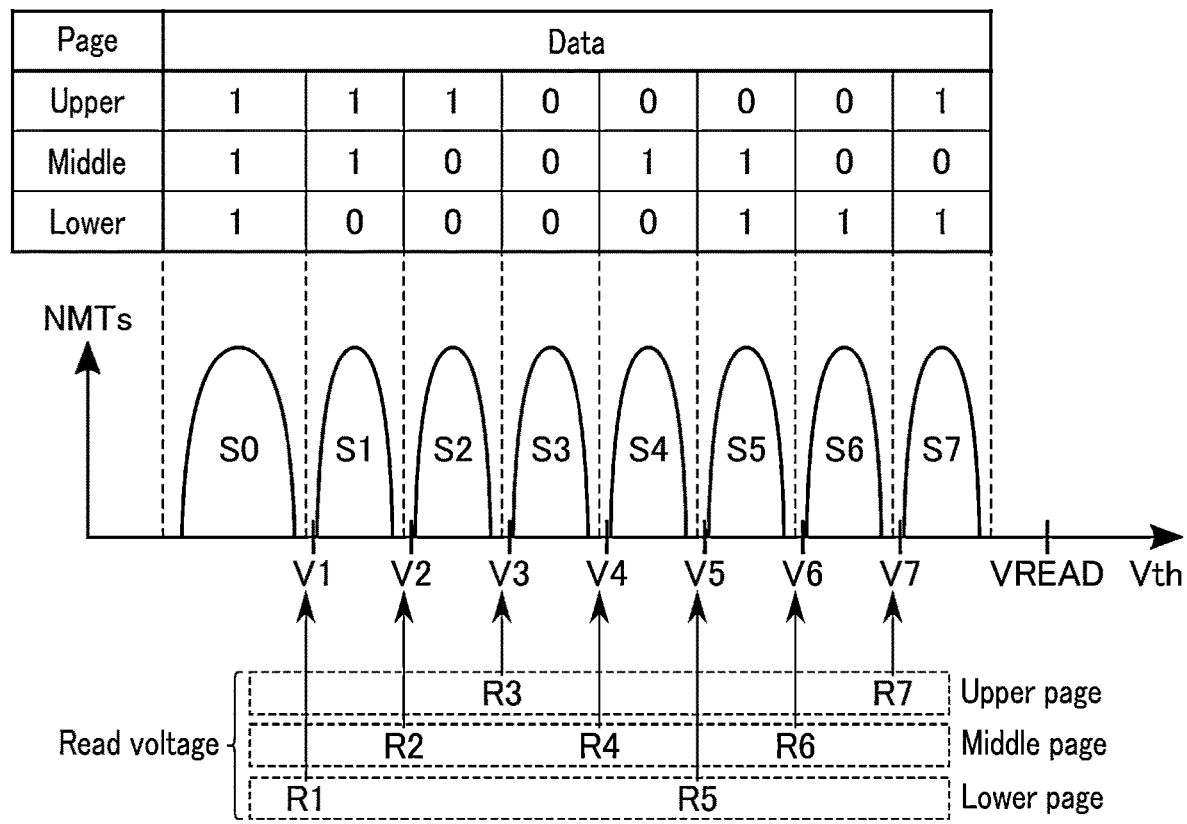
FIG. 7 is a diagram illustrating an example of threshold voltage distribution of a memory cell transistor and data allocation in the memory system according to the first embodiment.

FIG. 7 is a diagram illustrating an example of threshold voltage distribution of a memory cell transistor MT and data allocation in the memory system MS according to the first embodiment. "NMTs" on the vertical axis indicates the number of memory cell transistors MT. "Vth" on the horizontal axis indicates the threshold voltage of the memory cell transistor MT. As illustrated in FIG. 7, in a case where each memory cell transistor MT stores 3-bit data, the threshold voltage distribution of the plurality of memory cell transistors MT forms eight states. In the present specification, these eight states are referred to as state S0, state S1, state S2, state S3, state S4, state S5, state S6, and state S7 in order from a lower threshold voltage. Pieces of 3-bit data different from one another are allocated to the memory cell transistors MT belonging to the respective states S0 to S7. Note that data of one bit, two bits, or four bits or more may be stored in each memory cell transistor MT, or data different from that described below may be allocated to each memory cell transistor MT.

Hereinafter, an example of data allocation to the memory cell transistors MT belonging to the eight states will be described. The 3-bit data stored in each memory cell transistor MT is also referred to as upper bit data, middle bit data, and lower bit data. Further, 1-page data configured by upper bit data, middle bit data, and lower bit data stored in each of the plurality of memory cell transistors MT included in each cell unit CU is also referred to as upper page data, middle page data, and lower page data, respectively.

State S0: "111" data
State S1: "110" data
State S2: "100" data
State S3: "000" data
State S4: "010" data
State S5: "011" data
State S6: "001" data
State S7: "101" data Read voltages and verify voltages are respectively set to adjacent states. Specifically, a read voltage R1 is set between states S0 and S1. Similarly, read voltages R2 to R7 are set between states S1 to S6 and states S2 to S7, respectively. The read voltage is also referred to as a read level. Verify voltages V1 to V7 are set in association with states S1 to S7, respectively. In addition, a read path voltage VREAD is set to a voltage higher than that of the state having the highest threshold voltage (S7 state).

The read voltage is applied to the word line WL selected as the target of a read operation. A memory cell transistor MT included in a cell unit CU subject to the read operation in the selected word line WL is turned on if the memory cell transistor MT has a threshold voltage lower than the applied read voltage. The read path voltage VREAD is applied to the non-selected word lines WL. The memory cell transistors MT coupled to the word lines WL to which the read path voltage VREAD is applied are turned on regardless of data stored therein.

If the data allocation illustrated in FIG. 7 is applied, the lower page data is determined by read operations using the read voltages R1 and R5. The middle page data is determined by read operations using the read voltages R2, R4, and R6. The upper page data is determined by read operations using the read voltages R3 and R7. In the read operations using a plurality of read voltages to read page data, arithmetic processing is executed as needed in the sense amplifier unit SAU.

<1-2> Operation

Next, an operation of the memory system MS according to the first embodiment will be described.
<1-2-1> Outline of Vth Tracking First, an outline of Vth tracking will be described. The Vth tracking is an operation of searching for valley positions of threshold voltage distribution of two adjacent states (hereinafter, referred to as adjacent states) and estimating an optimum read level. The optimum read level is a value of the read level at which the number of error bits (fail bits) is minimized when the read operation is executed. The Vth tracking is also referred to as a tracking operation.

For example, in the Vth tracking, first, a shift read operation is executed a plurality of times according to setting of a preset read level. Each shift read operation is a read operation in which a shift amount of the read voltage from a start read level is designated. The shift amount is designated by, for example, a digital analog converter (DAC) value. In a plurality of times of shift read operations in the Vth tracking, a plurality of read levels set at equal intervals can be used. Then, the number of memory cell transistors MT turned on at each read level (also referred to as the number of on-cells) is counted, and a difference between the numbers of on-cells at two adjacent read levels is calculated. Then, a point at which the plot of the difference between the numbers of on-cells is convex downward, that is, a point at which the difference between the numbers of on-cells is the minimum is determined. Thereafter, a ratio of two differences adjacent to the minimum point is calculated. In addition, the voltage difference (potential difference) between the two read levels adjacent to the minimum point is internally divided by the calculated ratio. The voltage thus obtained is estimated to be the optimum read level.

Hereinafter, two adjacent read levels among a plurality of read levels used in a plurality of times of shift read operations executed in the Vth tracking are also referred to as adjacent read levels. The voltage difference (potential difference) between the adjacent read levels is also referred to as a step size. The value of the step size is also referred to as a step value. The step value may be designated by a DAC value, similar to the shift amount.

FIG. 8 is a schematic diagram illustrating an example of a fail bit count (error bit count) in adjacent states in the memory system MS according to the first embodiment. FIG. 8 illustrates threshold voltage distribution of adjacent states. In this example, each memory cell transistor MT is configured to store 1-bit data. In the present example, the adjacent states are associated with the "1" data and the "0" data in order from a lower threshold voltage, respectively.

The threshold voltage of the memory cell transistor MT may vary due to a factor such as a disturb. For example, the distribution width of the threshold voltage of each state may be widened, or the mode value of the threshold voltage distribution of each state may change. As a result, adjacent states may overlap as illustrated in FIG. 8. If the adjacent states overlap, there are a memory cell transistor MT in which "1" data is erroneously determined as "0" data and a memory cell transistor MT in which "0" data is erroneously determined as "1" data. In this example, the number of memory cell transistors MT in which "0" data is erroneously determined as "1" data is indicated as a fail bit count FBC1. Further, the number of memory cell transistors MT in which "1" data is erroneously determined as "0" data is indicated as a fail bit count FBC2.

In FIG. 8, RTRK corresponds to the optimum read level estimated by the Vth tracking. The RBST corresponds to an actual optimum read level. The RBST corresponds to an intersection of adjacent states.

In a case where "FBC1+FBC2" exceeds the number of correctable error bits, the ECC circuit 13 cannot correct the data correctly. Therefore, "FBC1+FBC2" is preferably as small as possible. "FBC1+FBC2" is minimized in a case where a read operation at the actual optimum read level (RBST) is executed. On the other hand, the optimum read level (RTRK) estimated by the Vth tracking may be a value different from the RBST according to the shape of the adjacent states. In FIG. 8, a difference between "FBC1+FBC2" in the read operation using the RBST and "FBC1+FBC2" in the read operation using the RTRK, which is different from the RBST, is indicated as a fail bit count FBC3. In the threshold voltage distribution of the adjacent states, the number of fail bits FBC3 corresponds to a region of a difference between a region corresponding to "FBC1+FBC2" in the read operation using the RBST and a region corresponding to "FBC1+FBC2" in the read operation using the RTRK. The number of fail bits FBC3 can be reduced by bringing the RTRK close to the RBST.

FIG. 9 is a schematic diagram illustrating an example of symmetric threshold voltage distribution of adjacent states. As illustrated in FIG. 9, in a case where state S (L−1) and state S (L) (L is an integer of 1 or larger) are substantially symmetric, the optimum read level can be estimated by the local minimum value of a quadratic function based on the plot of differences in the number of on-cells of a plurality of adjacent read levels obtained by the Vth tracking. That is, in a case where the adjacent states have symmetry, the optimum read level (RTRK) estimated by the Vth tracking substantially coincides with the actual optimum read level (RBST).

FIG. 10 is a schematic diagram illustrating an example of asymmetric threshold voltage distribution of adjacent states. As illustrated in FIG. 10, in a case where state S (L−1) and state S (L) are asymmetric, the optimum read level cannot be estimated with high accuracy with the minimum value of the quadratic function based on the plot of the difference in the number of on-cells of a plurality of adjacent read levels obtained by the Vth tracking. That is, in a case where the adjacent states are asymmetric, the optimum read level (RTRK) estimated by the Vth tracking is shifted to the plus side or the minus side with respect to the actual optimum read level (RBST).

FIG. 11 is a schematic diagram illustrating an example of more detailed threshold voltage distribution of the memory cell transistor MT. As illustrated in FIG. 11, in the present example, states S0 and S7 located at both ends have a shape wider than other states. Therefore, asymmetry between the pair of adjacent states S0 and S1 and the pair of adjacent states S6 and S7 becomes significant. Note that, hereinafter, a set of adjacent states S (L−1) and S (L) is referred to as states S(L−1)-S(L).

In (1) of FIG. 11, the vicinity of the valley position of states S0-S1 is illustrated in an enlarged manner. Hereinafter, the ratio between change in the threshold voltage and change in the number of the memory cell transistors MT having the threshold voltage is also referred to as a gradient of the threshold voltage distribution or simply a gradient. In (1) of FIG. 11, a case where the gradient on the side of state S0 is gentler than the gradient on the side of state S1 is illustrated. In this case, when Vth tracking using a plurality of read levels set at equal intervals is executed for the states S0-S1, the optimum read level (RTRK) estimated by the Vth tracking may deviate from the actual optimum read level (RBST).

In (2) of FIG. 11, the vicinity of the valley position of states S6-S7 is illustrated in an enlarged manner. In (2) of FIG. 11, a case where the gradient on the side of state S7 is gentler than the gradient on the side of state S6 is illustrated. In this case, when Vth tracking using a plurality of read levels set at equal intervals is executed for the states S6-S7, the optimum read level (RTRK) estimated by the Vth tracking may deviate from the actual optimum read level (RBST).

There is a case where the optimum read level (RTRK) estimated by Vth tracking is shifted to the side of a state having a gentler gradient (e.g., high potential side in the case of the states S6-S7). Furthermore, on the other hand, there is a case where the estimated optimum read level (RTRK) is shifted to the side of a state having a steeper gradient (e.g., low potential side in the case of the states S6-S7) depending on an estimation method.

Furthermore, in the present example, the other adjacent states are formed substantially symmetrically. In this case, in each of states S1-S2, states S2-S3, states S3-S4, and states S5-S6, the optimum read level (RTRK) estimated by Vth tracking may substantially coincide with the actual optimum read level (RBST).

Note that the asymmetry of the adjacent states may be more significant as the states are located closer to both ends of the threshold voltage distribution. Thus, in states S1-S2, states S5-S6, or the like, the optimum read level (RTRK) estimated by Vth tracking may deviate from the actual optimum read level (RBST). As described above, the adjacent states which have asymmetry are not limited to the adjacent states at both ends of the threshold voltage distribution. The tendency that adjacent states have asymmetry is similar even in a case where each memory cell transistor MT stores 2-bit data, 4 or more-bit data.

In Vth tracking, it is preferable that the optimum read level can be estimated with high accuracy in consideration of the asymmetry of the adjacent states described above. Therefore, as described below, the Vth tracking executed in the memory system MS according to the first embodiment has a function of estimating the optimum read level with high accuracy in consideration of the gradient of the threshold voltage distribution.

<1-2-2> Vth Tracking Considering Asymmetry of Adjacent States

Figure 12:
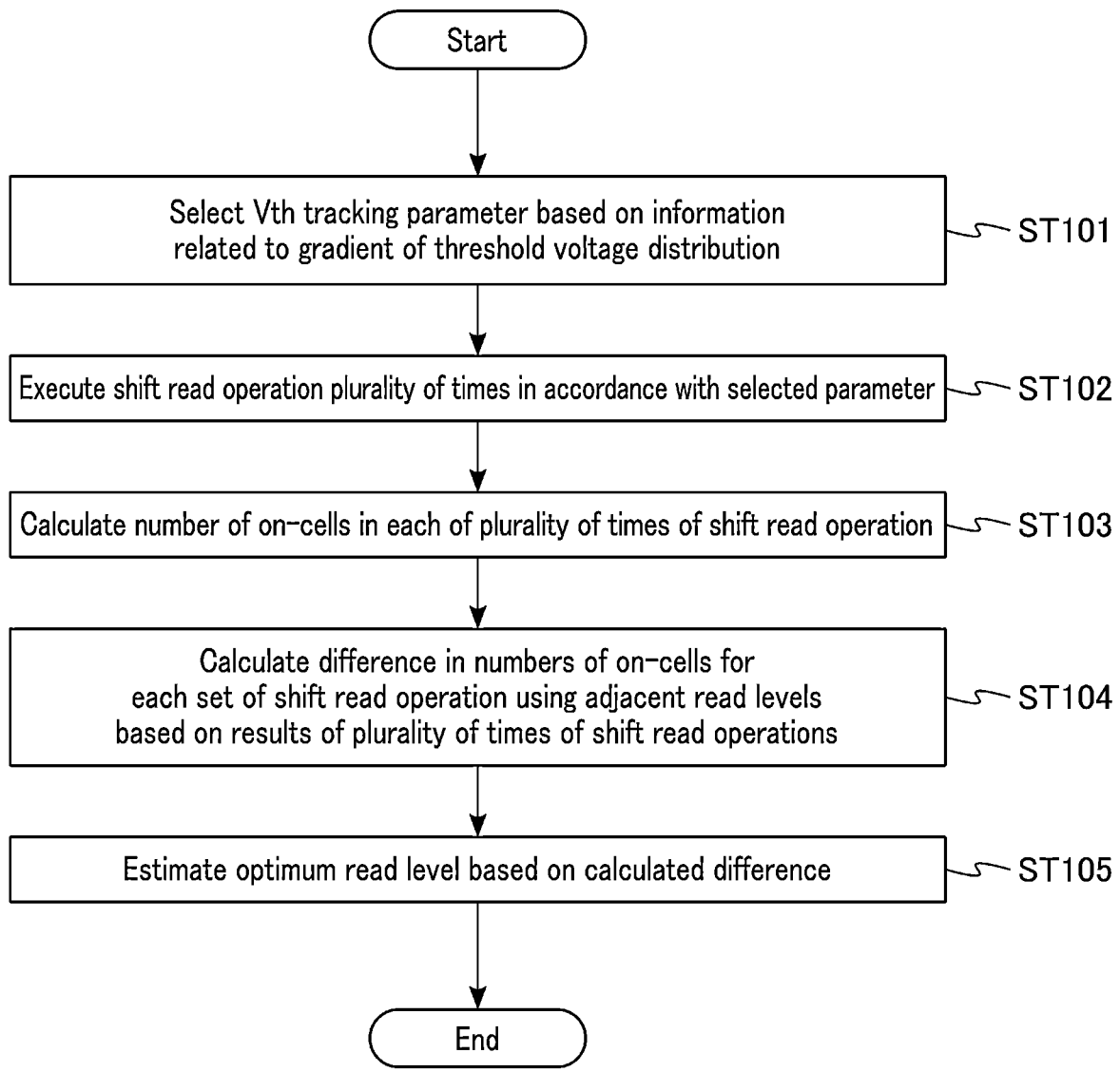
FIG. 12 is a flowchart illustrating an example of a procedure of Vth tracking executed in the memory system according to the first embodiment.

FIG. 12 is a flowchart illustrating an example of a procedure of Vth tracking executed in the memory system MS according to the first embodiment.

The memory system MS starts a series of processing illustrated in FIG. 12, for example, in a case where error correction of data read from the memory device 2 fails in a read operation or based on a predetermined schedule (Start).

First, the memory controller 1 selects a Vth tracking parameter based on information related to the gradient of the threshold voltage distribution of the memory cell transistor MT (ST101). The information related to the gradient of the threshold voltage distribution of the memory cell transistor MT is, for example, information related to the type of adjacent states, the address of a cell unit CU, or the optimum read level of the adjacent states obtained by the Vth tracking executed in advance. The tendency of the gradient of the threshold voltage distribution of the memory cell transistor MT may also change according to the address of the cell unit CU (that is, the position of the memory cell transistor MT in a block BLK).

The Vth tracking parameter (also referred to as a search read parameter) includes settings related to a read level (a start read level and a step value) used in a plurality of times of shift read operations executed in Vth tracking and the number of times of shift read operations executed in the Vth tracking (also referred to as a search count). The start read level is a read level used in the first shift read operation of a plurality of times of shift read operations. In the Vth tracking of the first embodiment, a plurality of step values different from each other can be used.

Next, the memory controller 1 executes a shift read operation a plurality of times in accordance with the selected parameter (ST102). In the processing of step ST102, for example, the memory controller 1 transmits a parameter setting instruction of the read operation and an execution instruction of the read operation to the memory device 2 in each of the plurality of times of shift read operations. The parameter setting instruction includes information related to a read level used in the shift read operation. Then, the memory controller 1 acquires a read result from the memory device 2 for each shift read operation.

Next, the memory controller 1 calculates the number of on-cells in each of the plurality of times of the shift read operation (ST103). For example, the memory controller 1 counts the number of memory cell transistors MT turned on from the read result. Note that, in a case where the memory device 2 includes a counter, the memory device 2 may count the number of on-cells based on the result of the shift read operation and transmit the count result to the memory controller 1.

Next, the memory controller 1 calculates a difference in the number of on-cells for each set of two times of shift read operations using the adjacent read levels based on the results of the plurality of times of shift read operations (ST104).

Next, the memory controller 1 estimates the optimum read level based on the calculated data (plot) of the difference in the number of on-cells (ST105). For example, the method described in "<1-2-1> Outline of Vth Tracking" is used to estimate the optimum read level.

When the processing of step ST105 is completed, the memory controller 1 ends the series of processing illustrated in FIG. 12 (End). The memory controller 1 may execute a read operation using the estimated optimum read level after the Vth tracking.

<1-2-3> Specific Examples of Step Value Set to Asymmetric Adjacent States

Specific examples of step values used in Vth tracking of asymmetric adjacent states are described below. Note that a case where a shift read operation is executed five times in Vth tracking will be described below.

(1: Case of Targeting States S0-S1)

FIG. 13 is a schematic diagram illustrating an example of a method of setting a step value used in Vth tracking for states S0-S1 executed in the memory system MS according to the first embodiment. As illustrated in FIG. 13, for example, step values SS1, SS2, and SS3 are used in the Vth tracking for states S0-S1. The step value SS1 is larger than the step value SS2. The step value SS2 is larger than the step value SS3. Then, in the Vth tracking for states S0-S1, SS1, SS2, SS2, and SS3 are applied, in order from a lower read level, as the step values of the four sets of adjacent read levels.

In a case where the gradient on the side of state so is gentler than the gradient on the side of state S1, in the Vth tracking for states S0-S1, at least a step value set on the side of state S0 may be larger than a step value set on the side of state S1. As a result, a change in the number of on-cells may be detected with low resolution in a voltage range on the side of state S0 with a gentle gradient, and a change in the number of on-cells can be detected with high resolution in a voltage range on the side of state S1 with a steep gradient.

As a result, the memory system MS according to the first embodiment can improve the estimation accuracy of the optimum read level (for example, by a quadratic function) based on the plot of the difference between the numbers of on-cells of the plurality of adjacent read levels obtained by Vth tracking. That is, the memory system MS can bring the optimum read level RTRK estimated by the Vth tracking for states S0-S1 closer to the actual optimum read level RBST than an optimum read level RTRK (ref) estimated by the Vth tracking using a single type of step value.

(2: Case of Targeting States S6-S7)

FIG. 14 is a schematic diagram illustrating an example of a method of setting a step value used in Vth tracking targeting states S6-S7 in the memory system MS according to the first embodiment. As illustrated in FIG. 14, in the Vth tracking for states S6-S7, for example, step values SS1, SS2, and SS3 similar to the Vth tracking for states S0-S1 are used. Then, in the Vth tracking for states S6-S7, SS3, SS2, SS2, and SS1 are applied, in order from a lower read level, as the step values of the four sets of adjacent read levels.

In a case where the gradient on the side of state S7 is gentler than the gradient on the side of state S6, in the Vth tracking for states S6-S7, at least a step value set on the side of state S7 may be larger than a step value set on the side of state S6. As a result, a change in the number of on-cells may be detected with low resolution in a voltage range on the side of state S7 with a gentle gradient, and a change in the number of on-cells can be detected with high resolution in a voltage range on the side of state S6 with a steep gradient.

As a result, the memory system MS according to the first embodiment can improve the estimation accuracy of the optimum read level (for example, by a quadratic function) based on the plot of the difference between the numbers of on-cells of the plurality of adjacent read levels obtained by Vth tracking. That is, the memory system MS can bring the optimum read level RTRK estimated by the Vth tracking for states S6-S7 closer to the actual optimum read level RBST than an optimum read level RTRK (ref) estimated by the Vth tracking using a single type of step value.

<1-3> Advantageous Effects of First Embodiment

As described above, the memory system MS according to the first embodiment can unevenly set the step value of the read level used in a plurality of times of shift read operations in Vth tracking. In other words, the memory system MS uses at least two or more different step values associated with asymmetric adjacent states for Vth tracking. Then, the memory system MS uses an algorithm that searches a voltage range in which the gradient of the threshold voltage distribution changes sharply with high resolution (that is, the step value is relatively small) and searches a voltage range in which the gradient of the threshold voltage distribution changes gently with low resolution (that is, the step value is relatively large).

The memory system MS according to the first embodiment can shift the axis of the quadratic curve to be the approximate curve by setting the step value according to the gradient of the threshold voltage distribution in the Vth tracking as described above. As a result, the memory system MS according to the first embodiment can suppress the shift (displacement) of the optimum read level estimated by Vth tracking from the actual optimum read level to the plus side or the minus side. That is, the memory system MS according to the first embodiment can bring the estimated optimum read level close to the actual optimum read level.

Then, the memory system MS according to the first embodiment can reduce the number of error bits (the number of fail bits) by using the optimum read level estimated by the Vth tracking using the unequal step values in a read operation for asymmetric adjacent states. Therefore, the memory system MS according to the first embodiment can obtain high reliability.

Note that the number of times of shift read operations executed in the Vth tracking described in the first embodiment is the same in a case where a plurality of mutually different step values is used and a case where a single type of step value is used. That is, the memory system MS of the first embodiment can improve the accuracy of Vth tracking without increasing the processing time of the Vth tracking.

<2> Second Embodiment

A memory system MS according to a second embodiment can execute Vth tracking similar to that of the first embodiment, and further has a function of estimating the gradient of the threshold voltage distribution of the memory cell transistor MT. Hereinafter, details of the memory system MS according to the second embodiment will be described mainly on differences from the first embodiment.

<2-1> Configuration

First, a configuration of the memory system MS according to the second embodiment will be described. The hardware configuration of the memory system MS according to the second embodiment is similar to that of the first embodiment. Hereinafter, a functional configuration of the memory system MS according to the second embodiment will be described. In the following description, it is assumed that a memory device 2 includes a core circuit 210 and a peripheral circuit 220. The core circuit 210 corresponds to a memory cell array 20, a row decoder module 27, a data register 28, and a sense amplifier module 29. The peripheral circuit 220 corresponds to an input/output circuit 21, a logic controller 22, a register circuit 23, a sequencer 24, a ready/busy controller 25, and a driver circuit 26.

Figure 15:
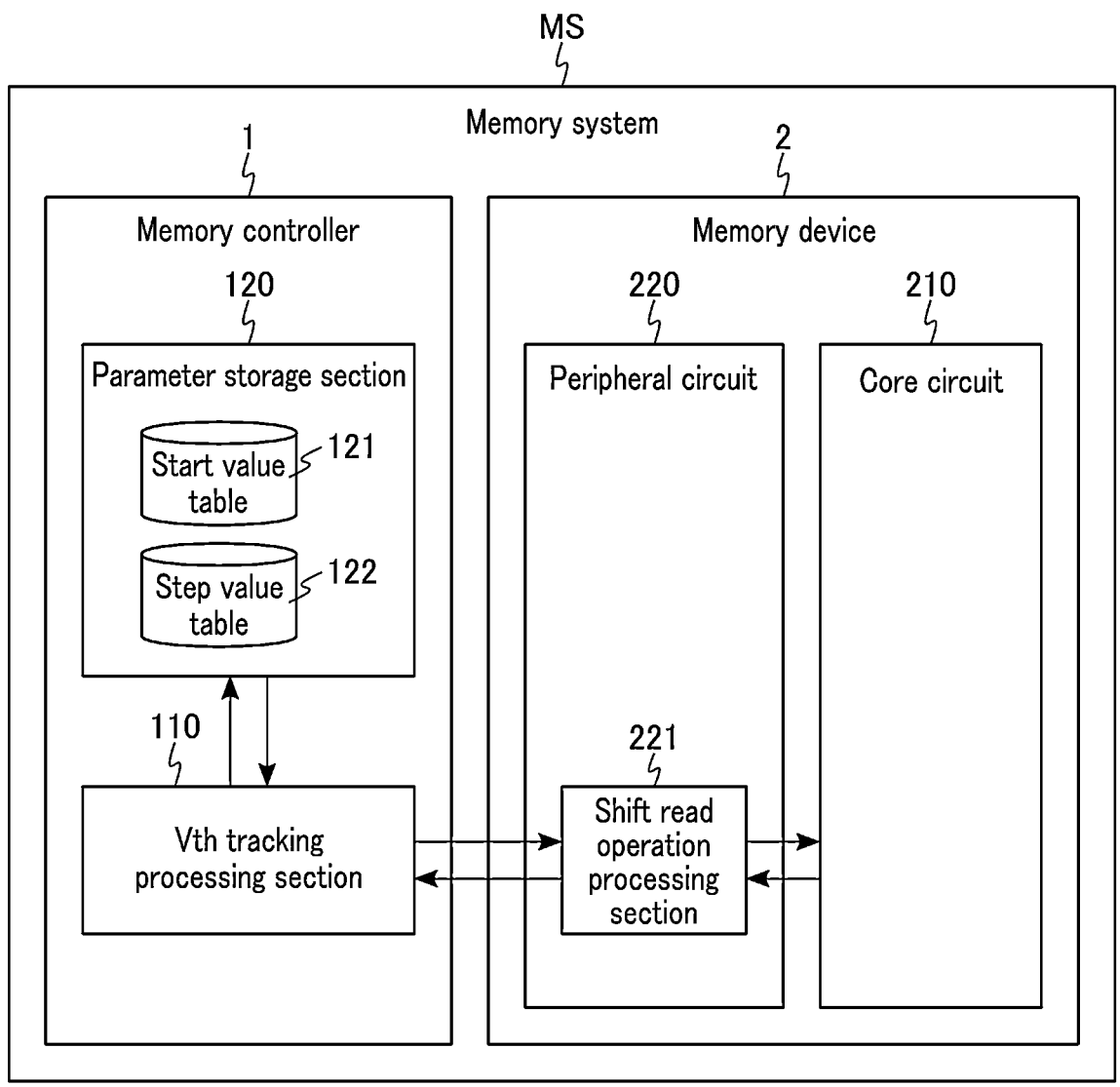
FIG. 15 is a block diagram illustrating an example of a functional configuration of a memory system according to a second embodiment.

FIG. 15 is a block diagram illustrating an example of a functional configuration of the memory system MS according to the second embodiment. As illustrated in FIG. 15, the memory controller 1 according to the second embodiment includes a Vth tracking processing section 110 and a parameter storage section 120. The parameter storage section 120 may be an SRAM. The peripheral circuit 220 of the memory device 2 according to the second embodiment includes a shift read operation processing section 221.

The Vth tracking processing section 110 has a function of executing Vth tracking described in the first embodiment. The parameter storage section 120 has a function of storing the Vth tracking parameter. The Vth tracking processing section 110 refers to the Vth tracking parameter stored in the parameter storage section 120 to determine a start read level and a step value to be used in Vth tracking. Further, the Vth tracking processing section 110 estimates the gradient of the threshold voltage distribution of the memory cell transistor MT based on the results of a shift read operation performed a plurality of times. Then, the Vth tracking processing section 110 has a function of selecting a more appropriate Vth tracking parameter with reference to the parameter storage section 120 based on the estimation result of the gradient of the threshold voltage distribution.

The parameter storage section 120 stores a plurality of types of Vth tracking parameters. Specifically, the parameter storage section 120 stores a start value table 121 and a step value table 122. The start value table 121 stores information of an initial value of a read level (that is, a start read level) used in a plurality of times of shift read operations executed in Vth tracking for each of adjacent states that can be subject to Vth tracking. The step value table 122 stores information of a step value of a read level used in a plurality of times of shift read operations executed in Vth tracking for each of adjacent states that can be subject to Vth tracking. For example, the Vth tracking parameter is preset in a plurality of types of combinations according to information related to gradients of adjacent states.

The shift read operation processing section 221 executes a shift read operation using a read level based on an instruction from the Vth tracking processing section 110. Then, the shift read operation processing section 221 outputs the result of the shift read operation to the Vth tracking processing section 110. Furthermore, the shift read operation processing section 221 can change the setting of a read level used in a shift read operation based on an instruction from the Vth tracking processing section 110.

(1: Specific Example of Start Value Table 121)

FIG. 16 is a diagram illustrating an example of the start value table 121 stored in the parameter storage section 120 of the memory controller 1 included in the memory system MS according to the second embodiment. As illustrated in FIG. 16, the start value table 121 stores, for example, a start read level used in Vth tracking of each of states S0-S1, states S1-S2, . . . , and states S6-S7 for each index value (for example, #0 to #4). The start read level is represented by, for example, a voltage value (V). Note that the start read level may be designated by a DAC value instead of the voltage value (V). In this case, a value obtained by multiplying the DAC value stored in the start value table 121 by a voltage value per DAC value corresponds to the start read level.

In the start value table 121, the start read levels $RL1\_k$, $RL2\_k$, . . . . $RL6\_k$, and $RL7\_k$ are stored in a plurality of fields associated with the columns of states S0-S1, states S1-S2, . . . , states S5-S6, and states S6-S7, respectively, in the row of the index value #k ("k" is an integer of 0 or larger).

More specifically, the start read levels $RL1\_0$, $RL2\_0$, . . . , $RL6\_0$, and $RL7\_0$ are stored in a plurality of fields associated with the columns of states S0-S1, states S1-S2, . . . , states S5-S6, and states S6-S7, respectively, in the row of the index value #0. The start read levels $RL1\_1$, $RL2\_1$, . . . , $RL6\_1$, and $RL7\_1$ are stored in a plurality of fields associated with the columns of states S0-S1, states S1-S2, . . . , states S5-S6, and states S6-S7, respectively, in the row of the index value #1. The same applies to the index value #2 and the subsequent index values.

In the start value table 121, the start read levels for the same adjacent states may be the same or different in a plurality of rows.

(2: Specific Example of Step Value Table 122)

FIG. 17 is a diagram illustrating an example of the step value table 122 stored in the parameter storage section 120 of the memory controller 1 included in the memory system MS according to the second embodiment. As illustrated in FIG. 17, the step value table 122 stores, for example, a step value used in Vth tracking of each of states S0-S1, states S1-S2, . . . , and states S6-S7 for each index value (for example, #0 to #4). The step value is represented by, for example, a DAC value, but may be represented by a voltage value (V) similarly to the start read level. In this example, it is assumed that a shift read operation is executed five times in Vth tracking, and four types of step values are stored for each of adjacent states. The four types of step values are associated with four adjacent read levels included in the five times of the shift read operation, respectively. Each step value indicates a difference between the associated DAC values or a difference between the voltage values of the adjacent read levels. In the following description, "a", "b", "c", and "d" will be added to the reference signs indicating the four types of step values set for each of adjacent states in order from the lower side of the associated adjacent read levels.

Specifically, in the step value table 122, in the row of the index value #k ("k" is an integer of 0 or larger), step values $SS1a\_k$, $SS1b\_k$, $SS1c\_k$, and $SS1d\_k$ are stored in the fields associated with the column of states S0-S1, step values $SS2a\_k$, $SS2b\_k$, $SS2c\_k$, and $SS2d\_k$ are stored in the fields associated with the column of states S1-S2, . . . , and step values $SS7a\_k$, $SS7b\_k$, $SS7c\_k$, and $SS7d\_k$ are stored in the fields associated with the column of states S6-S7.

More specifically, in the row of the index value #0, step values $SS1a\_0$, $SS1b\_0$, $SS1c\_0$, and $SS1d\_0$ are stored in the field associated with the column of states S0-S1, step values $SS2a\_0$, $SS2b\_0$, $SS2c\_0$, and $SS2d\_0$ are stored in the field associated with the column of states S1-S2, . . . , and step values $SS7a\_0$, $SS7b\_0$, $SS7c\_0$, and $SS7d\_0$ are stored in the field associated with the column of states S6-S7. In the row of the index value #1, step values $SS1a\_1$, $SS1b\_1$, $SS1c\_1$, and $SS1d\_1$ are stored in the field associated with the column of states S0-S1, step values $SS2a\_1$, $SS2b\_1$, $SS2c\_1$, and $SS2d\_1$ are stored in the field associated with the column of states S1-S2, . . . , and step values $SS7a\_1$, $SS7b\_1$, $SS7c\_1$, and $SS7d\_1$ are stored in the field associated with the column of states S6-S7.

Here, details of the read voltage in a case where the parameter of the index value #1 is used in the Vth tracking of states S0-S1 will be described. In this example, five read operations respectively using read levels RL1 (1) to RL1 (5) are executed in five times of shift read operations. The read level RL1 (1) used in the first shift read operation corresponds to the start read level and is set based on the start value table 121. The read level RL1 (2) used in the second shift read operation is set based on "RL1 (1)+$SS1a\_1$". The read level RL1 (3) used in the third shift read operation is set based on "RL1 (2)+$SS1b\_1$". The read level RL1 (4) used in the fourth shift read operation is set based on "RL1 (3)+$SS1c\_1$". The read level RL1 (5) used in the fifth shift read operation is set based on "RL1 (4)+$SS1d\_1$". For other index values and/or for other adjacent states, similarly to the case where the parameters of the index value #1 are used in the Vth tracking of states S0-S1, a plurality of read levels to be used in the shift read operation performed a plurality of times is also set in the step value.

Note that, in the step value table 122, a plurality of step values for the same adjacent states may be the same or different in a plurality of rows.

<2-2> Operation

Next, an operation of the memory system MS according to the second embodiment will be described.

Figure 18:
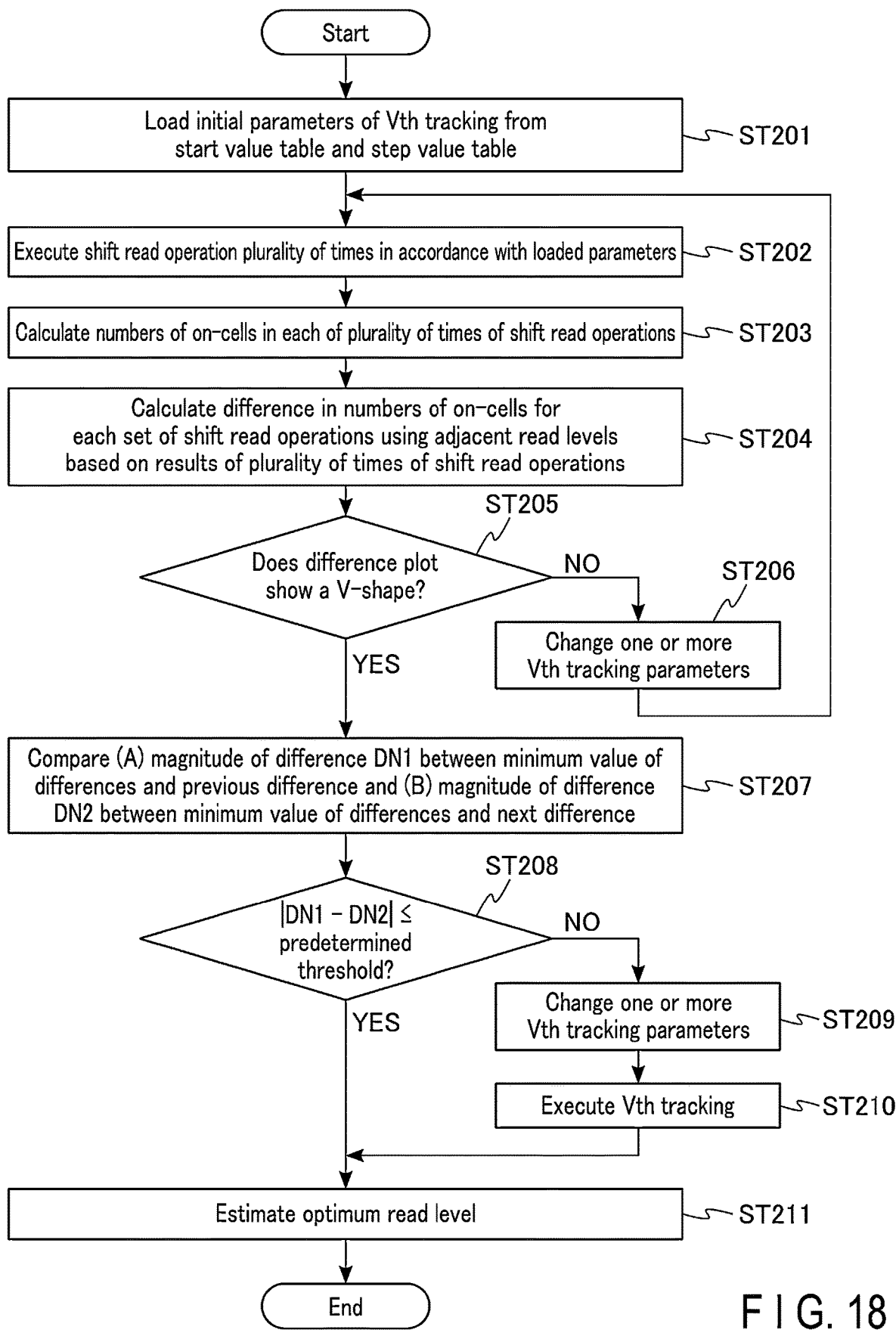
FIG. 18 is a flowchart illustrating an example of a procedure of Vth tracking executed in the memory system according to the second embodiment.

FIG. 18 is a flowchart illustrating an example of a procedure of Vth tracking executed in the memory system MS according to the second embodiment.

The memory system MS starts a series of processing illustrated in FIG. 18, for example, in a case where error correction of data read from the memory device 2 fails in a read operation or based on a predetermined schedule (Start).

First, the Vth tracking processing section 110 loads initial parameters of Vth tracking from each of the start value table 121 and the step value table 122 (ST201). The initial parameters to be loaded may be selected based on, for example, a type of adjacent states, the address of a cell unit CU, information regarding the optimum read level of the adjacent states obtained by Vth tracking executed in advance, operation logs of the memory system MS, or the like.

Next, the Vth tracking processing section 110 executes a shift read operation a plurality of times in accordance with the loaded parameters (ST202). In the plurality of times of shift read operations in the processing of step ST202, the Vth tracking processing section 110 may use a single type of step value or may use two or more types of step values different from each other.

Next, the Vth tracking processing section 110 calculates the number of on-cells in each of the plurality of times of shift read operations (ST203).

Next, the Vth tracking processing section 110 calculates a difference in the numbers of on-cells for each set of two times of shift read operations using the adjacent read levels, based on the results of the plurality of times of shift read operations (ST204).

Next, the Vth tracking processing section 110 determines whether or not a difference plot shows a V-shape (ST205). The difference plot corresponds to the plot of the difference of the numbers of on-cells obtained by the processing of step ST204. For example, in a case where the read level range in which the shift read operation is executed a plurality of times in the processing of step ST202 includes a decreasing voltage range and an increasing voltage range, the difference plot shows a V-shape. Here, the decreasing voltage range is a voltage range in which the difference in the numbers of on-cells decreases with an increase in the read level. The increasing voltage range is a voltage range in which the difference in the numbers of on-cells increases with an increase in the read level. The V-shape can be determined, for example, by whether the minimum point of a quadratic function is included in the read level range, in a case where the difference plot is approximated by the quadratic function.

If it is determined that the difference plot does not show a V-shape in the processing of step ST205 (ST205: NO), the Vth tracking processing section 110 changes one or more Vth tracking parameters (ST206). In the processing of step ST206, the Vth tracking processing section 110 changes, for example, at least one of the start read level and the step value. Then, the Vth tracking processing section 110 proceeds to processing of step ST202. That is, the Vth tracking processing section 110 executes the processing of steps ST202 to ST205 using the changed Vth tracking parameters.

If it is determined that the difference plot shows a V-shape in the processing of step ST205 (ST205: YES), the Vth tracking processing section 110 calculates a difference DN1 between the minimum value of the plurality of obtained differences and a previous difference. The Vth tracking processing section 110 also calculates a difference DN2 between the minimum value and a next difference. The Vth tracking processing section 110 then compares the magnitudes of the difference DN1 and the difference DN2 (ST207). Details of the processing of step ST207 will be described later. Then, the Vth tracking processing section 110 determines whether or not the absolute value of the difference between the DN1 and the DN2 is equal to or less than a predetermined threshold value (ST208), based on the comparison result of step ST207. Note that a plurality of thresholds may be set for the absolute value of the difference.

If it is determined that the absolute value of the difference between DN1 and DN2 is equal to or less than the predetermined threshold in the processing of step ST208 (ST208: YES), that is, if the asymmetry of the threshold voltage distribution of the adjacent states is within the expectation, the Vth tracking processing section 110 proceeds to processing of step ST211. The absolute value of the difference between DN1 and DN2 being equal to or smaller than the predetermined threshold value indicates that a preferable Vth tracking parameter has been set in the shift read operation performed a plurality of times in step ST202.

If it is determined that the absolute value of the difference between DN1 and DN2 is larger than the predetermined threshold in the processing of step ST208 (ST208: NO), that is, if the asymmetry of the threshold voltage distribution of the adjacent states is not within the expectation, the Vth tracking processing section 110 changes one or more Vth tracking parameters (ST209). In the processing of step ST209, for example, the Vth tracking processing section 110 changes the row (that is, the index value) of the step value table 122 to be used in the next Vth tracking. Then, the Vth tracking processing section 110 executes Vth tracking by using the changed Vth tracking parameters (ST210). When the processing of step ST210 is completed, the Vth tracking processing section 110 proceeds to processing of step ST211.

In the processing of step ST211, the Vth tracking processing section 110 estimates the optimum read level. Note that, in the processing of ST211, in a case where the determination of step ST208 has been "YES", the Vth tracking processing section 110 estimates the optimum read level based on the results of the plurality of times of shift read operations performed in step ST202. In addition, in a case where the determination of step ST208 has been "NO", the Vth tracking processing section 110 estimates the optimum read level based on the results of the plurality of times of shift read operations performed in the Vth tracking in step ST210. When the processing of step ST211 is completed, the Vth tracking processing section 110 ends the series of processing illustrated in FIG. 18 (End).

Note that, in a case where the processing has shifted from step ST206 to step ST202, the plurality of times of shift read operations in step ST202 may be replaced with an additional single shift read operation. In this case, the processing of steps ST203 and ST204 is executed again based on the results of the additional single shift read operation according to the changed Vth parameters and the plurality of times of shift read operations executed before the change of the Vth parameters. Then, in the processing of step ST205, it is determined again whether or not the difference plot of the number of on-cells shows a V-shape. As a result, the memory system MS can reduce the number of times of shift read operations executed in Vth tracking.

Note that processing similar to that in step ST205 may be executed between steps ST210 and ST211. In a similar processing to step ST205, if it is determined that the difference plot shows a V-shape, the Vth tracking processing section 110 proceeds to the processing of step ST211. In a similar processing to step ST205, if it is determined that the difference plot does not show a V-shape, for example, the Vth tracking processing section 110 may proceed to the processing of step ST206.

Note that the difference between the difference DN1 and the difference DN2, instead of the absolute value of the difference between the difference DN1 and the difference DN2, may be used for comparison with the predetermined threshold value in step ST208. In this case, the difference between the difference DN1 and the difference DN2 is calculated by "DN1−DN2" or "DN2−DN1".

(1: Specific Example of Processing in Steps ST207 to ST209)

FIG. 19 is a schematic diagram illustrating a specific example of processing of steps ST207 to ST209 described with reference to FIG. 18. FIG. 19 illustrates difference plots corresponding to (j−1)th (j is an integer of 2 or larger), jth, (j+1)th, and (j+2)th shift read operations among the plurality of times of shift read operations executed while increasing the read level. As illustrated in FIG. 19, the read levels RL (j−1), RL (j), RL (j+1), and RL (j+2) are used in the (j−1)th, jth, (j+1)th, and (j+2)th shift read operations, respectively. The relationship of the read level height is RL (j−1)<RL (j)<RL (j+1)<RL (j+2). The difference in the numbers of on-cells corresponding to the (j−1)th and jth shift read operations is N3 (difference plot D (j−1)). The difference in the numbers of on-cells corresponding to the jth and (j+1)th shift read operations is N1 (difference plot D (j)). The difference in the numbers of on-cells corresponding to the (j+1)th and (j+2)th shift read operations is N2 (difference plot D (j+1)). The relationship among the magnitudes of the differences in the numbers of on-cells is N1<N2<N3. That is, in this example, the minimum value, the previous difference, and the next difference, of step ST207 are N1, N3, and N2, respectively.

For example, the Vth tracking processing section 110 detects that the valley position of the difference plot corresponds to the difference plot D (j) based on the fact that N1−N3 is negative and the fact that N2−N1 is positive. In this case, the difference DN1 corresponds to N3−N1. The difference DN2 corresponds to N2−N1. In the present example, since the difference DN1 is larger than the difference DN2, the Vth tracking processing section 110 detects that the gradient of the threshold voltage distribution is steeper in the difference plots D (j−1) to D (j) than in the difference plots D (j) to D (j+1). Thereafter, for example, in a case where the absolute value of the difference between DN1 and DN2 is larger than the predetermined threshold (ST208: NO), the Vth tracking processing section 110 changes the Vth tracking parameters by the same algorithm as that of the first embodiment (ST209).

(2: Specific Example of Command Sequence)

FIG. 20 is a table illustrating an example of a command sequence used in the memory system MS according to the second embodiment. As illustrated in FIG. 20, the memory system MS uses, for example, command sets CS1 to CS3. The command sets CS1 to CS3 are, for example, command sets used in a shift read operation executed in the processing of step ST202 described with reference to FIG. 18.

The command set CS1 includes, for example, "aah", "ADD (LUN)", "ADD (AAh)", and "DAT1". Here, "aah" is a command instructing designation of a read level used in a shift read operation, and "ADD (LUN)" is a logical unit number (LUN) to designate the read level. If the memory system MS includes a plurality of memory devices 2, the logical unit number is assigned to each of the plurality of memory devices 2. Further, "ADD (AAh)" is an address of a register that stores the setting of the read level, and "DAT1" is information indicating the shift amount of the read level. For example, "DAT1" includes a DAC value corresponding to the shift amount. When receiving "aah", "ADD (LUN)", "ADD (AAh)", and "DAT1" in this order from the memory controller 1, the memory device 2 transitions to a busy state and sets the parameter "DAT1" in the register designated by "ADD (LUN)" and "ADD (AAh)". When the parameter setting is completed, the memory device 2 transitions to the ready state. The time tFEAT is a time when the memory device 2 executes processing based on the command set CS1.

The command set CS2 includes, for example, "01h/02h/03h", "00h", "ADD (CUsel)", and "30h". Here, "01h/02h/03h" is a command for designating page data to be read. For example, "01h", "02h", and "03h" are associated with lower page data, middle page data, and upper page data, respectively. Further, "00h" is a command instructing a read operation, "ADD (CUsel)" is an address of the cell unit CU to be read, and "30h" is a command for instructing the start of the read operation. When receiving "01h/02h/03h", "00h", "ADD (CUsel)", and "30h" in this order from the memory controller 1, the memory device 2 transitions to the busy state and executes the read operation of page data designated by "01h/02h/03h" from the cell unit CU designated by "ADD (CUsel)". When the read operation is completed, the memory device 2 transitions to the ready state. The time tR is a time when the memory device 2 executes processing based on the command set CS2.

The command set CS3 includes, for example, "bbh", "ADD (CUsel)", and "E0h". Here, "bbh" is a command that designates transfer of data stored in the data register 28 by a read operation such as a shift read operation. Further, "E0h" is a command instructing the start of the data transfer. When receiving "bbh", "ADD (CUsel)", and "E0h" in this order from the memory controller 1, the memory device 2 outputs the data stored in the data register 28 to the memory controller 1 (Data-out).

Note that in the processing of step ST202, the command set CS1 used for parameter setting of shift read operations may be issued for each state in a case where a read operation for a plurality of states is executed.

<2-3> Advantageous Effects of Second Embodiment

As described above, the memory system MS according to the second embodiment can detect the gradient near the valley position of the threshold voltage distribution of adjacent states. In the second embodiment, a combination of the Vth tracking parameters is selected from at least two or more sets using the start value table 121 and the step value table 122.

As a result, the memory system MS according to the second embodiment can change the step value in the Vth tracking according to the gradient of the threshold voltage distribution before and after the valley position as in the first embodiment. That is, the memory system MS according to the second embodiment can bring the optimum read level estimated by Vth tracking close to the actual optimum read level, similarly to the first embodiment. Therefore, the memory system MS according to the second embodiment can reduce the number of error bits and obtain high reliability, similarly to the first embodiment.

In the second embodiment, the Vth tracking parameter is changed according to the comparison result of the magnitude of the gradient near the valley position of the threshold voltage distribution, and the Vth tracking can be retried. As a result, the memory system MS according to the second embodiment can estimate the optimum read level with higher accuracy than the first embodiment.

<2-4> Modification of Second Embodiment

Figure 21:
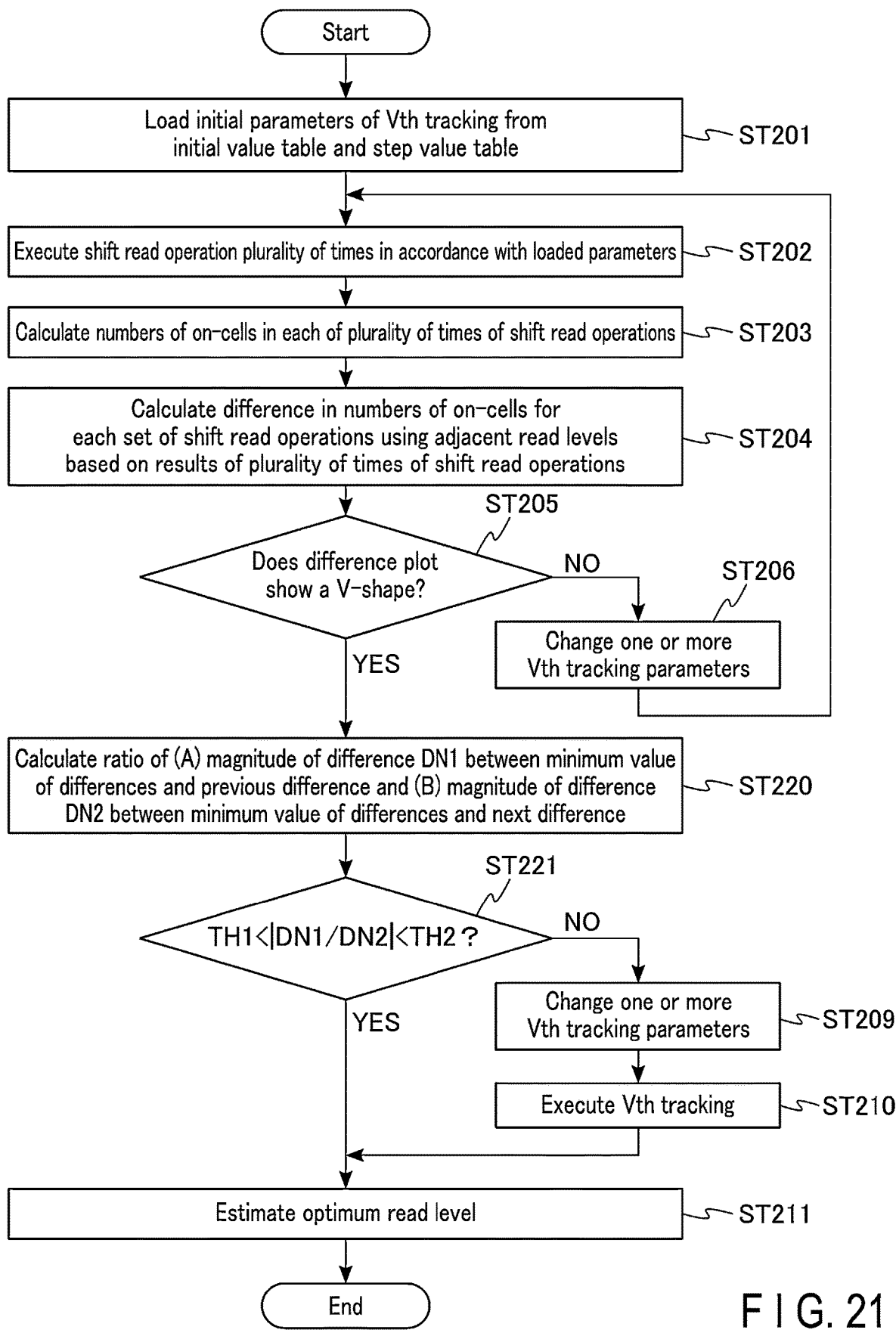
FIG. 21 is a flowchart illustrating an example of a procedure of a modification of Vth tracking executed in the memory system according to the second embodiment.

FIG. 21 is a flowchart illustrating an example of a procedure of a modification of Vth tracking executed in the memory system according to the second embodiment. The procedure illustrated in the flowchart of FIG. 21 has a configuration in which the processing of steps ST207 and ST208 are replaced with the processing of steps ST220 and ST221, respectively, in the procedure illustrated in the flowchart of FIG. 18.

In the processing of step ST220, the Vth tracking processing section 110 calculates a difference DN1 between the minimum value of the plurality of obtained differences and a previous difference. The Vth tracking processing section 110 also calculates a difference DN2 between the minimum value and a next difference. The Vth tracking processing section 110 then calculates a ratio of the difference DN1 and the difference DN2 (ST220). Then, the Vth tracking processing section 110 determines whether or not the absolute value (|DN1/DN2|) of the ratio between the difference DN1 and the difference DN2 is within a predetermined range (ST221). Specifically, in the processing of step S221, it is determined whether the absolute value (|DN1/DN2|) is between a first threshold value TH1 and a second threshold value TH2. The first threshold value TH1 is, for example, 0.75. The second threshold value TH2 is, for example, 1.33. As the absolute value of the ratio is closer to 1, it indicates that more preferable Vth tracking parameters have been set in the shift read operation performed a plurality of times in step ST202. A plurality of threshold ranges may be set for the absolute value of the ratio. If it is determined in the processing of step ST221 that the absolute value (|DN1/DN2|) is within the predetermined range (ST221: YES), the Vth tracking processing section 110 proceeds to processing of step ST211. If it is determined in the processing of step ST221 that the absolute value (|DN1/DN2|) is not within the predetermined range (ST221: NO), the Vth tracking processing section 110 proceeds to processing of step ST209.

Other processing of the modification of the Vth tracking illustrated in FIG. 21 is similar to the processing illustrated in FIG. 18. In the modified example of the Vth tracking executed in the second embodiment, the optimum read level can be estimated with high accuracy, similarly to the Vth tracking executed in the second embodiment.

<3> Third Embodiment

A memory system MS according to a third embodiment can execute Vth tracking similar to that of the second embodiment, and further has a function of selecting a Vth tracking parameter based on an operation log. Hereinafter, details of the memory system MS according to the third embodiment will be described mainly on differences from the first and second embodiments.

<3-1> Configuration

First, a configuration of the memory system MS according to the third embodiment will be described. The hardware configuration of the memory system MS according to the third embodiment is similar to that of the first embodiment. Hereinafter, a functional configuration of the memory system MS according to the third embodiment will be described.

FIG. 22 is a block diagram illustrating an example of the functional configuration of the memory system MS according to the third embodiment. As illustrated in FIG. 22, the memory controller 1 according to the third embodiment includes a Vth tracking processing section 110a, a parameter storage section 120a, and an operation log storage section 130. The parameter storage section 120a and the operation log storage section 130 may be an SRAM. A peripheral circuit 220 of the memory device 2 according to the third embodiment includes a shift read operation processing section 221 similar to that of the second embodiment.

The Vth tracking processing section 110a has a function similar to that of the Vth tracking processing section 110 described in the second embodiment. Further, the Vth tracking processing section 110a refers to Vth tracking parameter stored in the parameter storage section 120a based on operation logs of the memory device 2 recorded in the operation log storage section 130. From the operation log of the memory device 2, a change in the gradient of the threshold voltage distribution can be estimated. Then, the Vth tracking processing section 110a determines the start read level and the step value to be used in Vth tracking based on an start value table 121 and a step value table 122 associated with the operation log.

The parameter storage section 120a stores a start value table set 140 and a step value table set 150. The start value table set 140 includes a plurality of start value tables 121. Each of the plurality of start value tables 121 is associated with a numerical value that can be indicated by the operation log. The plurality of start value tables 121 include information of a start read level suitable for the gradient of the threshold voltage distribution estimated from the operation log of the associated numerical value. The step value table set 150 includes a plurality of step value tables 122. Each of the plurality of step value tables 122 is associated with a numerical value that can be indicated by the operation log. The plurality of step value tables 122 include information of step values suitable for the gradient of the threshold voltage distribution estimated from the operation log of the associated numerical value. The configurations of the start value table 121 and the step value table 122 are, for example, similar to those of the second embodiment.

The operation log storage section 130 stores an operation log of the memory system MS. The operation log storage section 130 records, for example, the number of times of write/erase operations, a data retention period, and the number of times of read operations, according to the operation of the memory system MS. The number of times of write/erase operations corresponds to the number of times of execution of a set of the write operation and the erase operation. The number of times of write/erase operations may be managed in units of blocks BLK, or may be managed in units of chips, pages, or cell units CU. The data retention period corresponds to an elapsed time after data is written to a cell unit CU in the erase state. The number of times of read operations corresponds to the number of times of execution of the read operation since the data is written.

As the number of times of write/erase operations, the number of times of read operations, or the data retention period increases, the gradient of the threshold voltage distribution may change. For example, as the data retention period of a cell unit CU elapses, the threshold voltage distribution in each state is widely distributed with respect to its low voltage side. Conversely, as the number of times of write/erase operations or the number of times of read operations increases, the threshold voltage distribution in each state is widely distributed with respect to its high voltage side. Therefore, due to the stress on the cell unit CU, the adjacent threshold voltage distributions can be asymmetric distributions having gradients different from each other.

The operation log of the memory system MS may include other information. The other information that may be included in the operation log is, for example, the number of executions of Vth tracking, the operating temperature of the memory system MS, the operating time of the memory system MS, or the like.

Each of the plurality of start value tables 121 and the plurality of step value tables 122 stored in the parameter storage section 120a may be provided, for example, according to the number of times of write/erase operations, according to the data retention period, or according to the number of times of read operations. That is, the parameter storage section 120a may store a plurality of tables for changing the Vth tracking parameters with the number of times of write/erase operations as a trigger, may store a plurality of tables for changing the Vth tracking parameters with the data retention period as a trigger, or may store a plurality of tables for changing the Vth tracking parameters with the number of times of read operations as a trigger. In each step value table 122, a plurality of different step values can be set as in the first embodiment. The plurality of step values are desirably set to correspond to the shape of the threshold voltage distribution. Each of the start value table 121 and the step value table 122 may be a table including a read level for the operation log of the memory system MS.

Here, as a more specific example, a case where the Vth tracking parameter is changed with the number of times of write/erase operations as a trigger, that is, a case where the Vth tracking parameter is changed before and after the number of times of write/erase operations reaches a threshold will be described. In a case where the number of times of write/erase operations increases, as described above, the threshold voltage distribution may have a shape widely distributed on the high potential side in each state. In this case, the threshold voltage distribution of adjacent states may be a distribution in which one (high potential side) is steep and the other (low potential side) is gentle with respect to the valley position of the adjacent states as a boundary. When the number of times of write/erase operations to a cell unit CU increases, for example, the distribution of state S0, which is a state on the low potential side of the threshold voltage distribution, may be widely distributed on its high potential side. At this time, the distribution on the high potential side of state s0 has a relatively gentle gradient as compared with the distribution on the low potential side of state S1, which is adjacent to state S0. Therefore, the threshold voltage distribution configured by state S0 and state S1 becomes an asymmetric distribution, and the optimum read level (RTRK) estimated by Vth tracking deviates from the actual optimum read level (RBST). On the other hand, the memory system MS according to the present embodiment sets a set of step values such that a step value on the side of state S1 where the gradient of the threshold voltage distribution is relatively steep is relatively small, and a step value on the side of state S0 where the gradient of the threshold voltage distribution is relatively gentle is relatively large. As a result, the estimation accuracy of the optimum read level (RTRK) estimated by Vth tracking can be improved. As described above, similarly to the second embodiment, the memory system MS according to the present embodiment can search for the threshold voltage distribution with high accuracy by decreasing a step value on the low potential side of the high potential state of the adjacent states and increasing a step value on the high potential side of the low potential state of the adjacent states.

Next, a case where the Vth tracking parameter is changed with the data retention period as a trigger, that is, a case where the Vth tracking parameter is changed before and after the data retention period reaches a threshold will be described. In a case where the data retention period increases, for example, the threshold voltage distribution on the high potential side (for example, states S6-S7) may have a shape widely distributed on the low potential side. The influence of the data retention period may be remarkably exhibited in state S6 or state S7, for example. Specifically, when the data retention period with respect to a cell unit CU increases, for example, the distribution of state S7, which is a state on the high potential side of the threshold voltage distribution, may be widely distributed on the low potential side. At this time, the distribution on the low potential side of state S7 has a relatively gentle gradient as compared with the distribution on the high potential side of state S6, which is adjacent to state S7. Therefore, the threshold voltage distribution configured by state S6 and state S7 becomes an asymmetric distribution, and the optimum read level (RTRK) estimated by Vth tracking deviates from the actual optimum read level (RBST). On the other hand, the memory system MS according to the present embodiment sets a set of step values such that a step value on the side of state S6 where the gradient of the threshold voltage distribution is relatively steep is relatively small, and a step value on the side of state S7 where the gradient of the threshold voltage distribution is relatively gentle is relatively large, thereby improving the estimation accuracy of the optimum read level (RTRK) estimated by Vth tracking. That is, the memory system MS according to the present embodiment can search for the threshold voltage distribution with high accuracy by decreasing a step value on the high potential side of the low potential state of the adjacent states and increasing a step value on the low potential side of the high potential state of the adjacent states.

Next, a case where the Vth tracking parameter is changed with the number of times of read operations as a trigger, that is, a case where the Vth tracking parameter is changed before and after the number of times of read operations reaches a threshold will be described. In a case where the number of times of read operations increases, for example, the threshold voltage distribution may have a shape widely distributed on the high potential side in each state. In this case, the threshold voltage distribution of the adjacent states may be a distribution in which the gradient of one (high potential side) is steep and the gradient of the other (low potential side) is gentle with respect to the valley position of the adjacent states as a boundary. When the number of times of read operations to a cell unit CU increases, for example, the distribution of state S0, which is a state on the low potential side of the threshold voltage distribution, is widely distributed on the high potential side. At this time, the distribution on the high potential side of state S0 has a relatively gentle gradient as compared with the distribution on the low potential side of state S1, which is adjacent to state S0. Therefore, the threshold voltage distribution configured by state S0 and state S1 becomes an asymmetric distribution, and the optimum read level (RTRK) estimated by Vth tracking deviates from the actual optimum read level (RBST). On the other hand, the memory system MS according to the present embodiment sets a set of step values such that a step value on the side of state S1 where the gradient of the threshold voltage distribution is relatively steep is relatively small, and a step value on the side of state S0 where the gradient of the threshold voltage distribution is relatively gentle is relatively large, thereby improving the estimation accuracy of the optimum read level (RTRK) estimated by Vth tracking. As described above, the memory system MS according to the present embodiment can search for the threshold voltage distribution with high accuracy by decreasing a step value on the low potential side of the high potential state of the adjacent states and increasing a step value on the high potential side of the low potential state of the adjacent states.

Note that each of the start value table set 140 and the step value table set 150 may be set for each stress condition such as the number of times of write/erase operations, the data retention time, and the number of times of read operations. As a result, the start value table 121 and the step value table 122 that are different for each stress condition can be selected. The memory system MS may use a start value table set 140 and a step value table set 150 different for each stress condition in combination.

For example, it is desirable that an index number is assigned to the start value table 121 and the step value table 122 according to the range of the number of times of write/erase operations. By assigning one index number to the range of the stress condition to which the same Vth tracking parameter is applied, the memory system MS can select the optimal Vth tracking parameter for each stress condition.

<3-2> Operation

Next, an operation of the memory system MS according to the third embodiment will be described.

FIG. 23 is a flowchart illustrating an example of a procedure of setting initial parameters of Vth tracking executed in the memory system MS according to the third embodiment.

When the processing of step ST201 described with reference to FIG. 18 is started (Start), the Vth tracking processing section 110a determines the stress state with reference to the operation log stored in the operation log storage section 130 (ST301). The operation log referred to in the processing of step ST301 includes, for example, information of the number of times of write/erase operations, a data retention period, or the number of times of read operations.

Next, the Vth tracking processing section 110a selects the start value table 121 corresponding to the current stress state from the start value table set 140 (ST302). Furthermore, the Vth tracking processing section 110a selects the step value table 122 corresponding to the current stress state from the step value table set 150 (ST303). For example, a first start value table 121 and a first step value table 122 are selected in a case where the number of times of write/erase operations is less than a first threshold, and a second start value table 121 and a second step value table 122 are selected in a case where the number of times of write/erase operations is greater than or equal to the first threshold. Similarly, a third start value table 121 and a third step value table 122 may be selected in a case where the data retention period is less than a second threshold, and a fourth start value table 121 and a fourth step value table 122 may be selected in a case where the data retention period is greater than or equal to the second threshold. Similarly, a fifth start value table 121 and a fifth step value table 122 may be selected in a case where the number of times of read operations is less than a third threshold, and a sixth start value table 121 and a sixth step value table 122 may be selected in a case where the number of times of read operations is greater than or equal to the third threshold.

When the processing of step ST303 is completed, the series of processing included in step ST201 is ended (End), and the Vth tracking processing section 110a proceeds to the processing of step ST202 described with reference to FIG. 18. Other operations of the memory system MS according to the third embodiment is similar to those of the second embodiment.

Note that the order of the processing of step ST302 and the processing of step ST303 may be interchanged. The processing of step ST302 and the processing of step ST303 may be executed in parallel. The threshold for the operation log used to select the start value table 121 and the threshold for the operation log used to select the step value table 122 may be different from each other. In addition, each of the start value table set 140 and the step value table set 150 may be managed in units of a single or a plurality of chips or in units of a single or a plurality of blocks.

<3-3> Advantageous Effects of Third Embodiment

The threshold voltage distribution of the memory cell transistor MT is tend to correspond to the stress state. Therefore, the memory system MS according to the third embodiment monitors the stress state of the memory device 2 with reference to the operation log. Then, the memory system MS according to the third embodiment changes the initial value of the Vth tracking parameter (at least one of the start read level and the step value) based on the operation log. As a result, the memory system MS according to the third embodiment can improve the accuracy of the estimation of the optimum read level in the Vth tracking executed first. Therefore, the memory system MS according to the third embodiment can reduce the number of error bits and obtain high reliability.

In addition, the memory system MS according to the third embodiment can reduce the possibility of executing the processing of steps ST209 and ST210 described with reference to the flowcharts of FIGS. 18 and 21 by applying the Vth tracking parameter based on the operation log. That is, the memory system MS according to the third embodiment can suppress an increase in time required for estimating the optimum read level, and can improve the performance of the memory system MS.

<4> Fourth Embodiment

In a memory system MS according to a fourth embodiment, the memory device 2 is configured to execute part of the processing of Vth tracking similar to that in the first embodiment based on an instruction from the memory controller 1. Hereinafter, details of the memory system MS according to the fourth embodiment will be described mainly on differences from the first and third embodiments.

<4-1> Configuration

First, a configuration of the memory system MS according to the fourth embodiment will be described. The hardware configuration of the memory system MS according to the fourth embodiment is similar to that of the first embodiment. Hereinafter, a functional configuration of the memory system MS according to the fourth embodiment will be described.

FIG. 24 is a block diagram illustrating an example of a functional configuration of the memory system MS according to the fourth embodiment. As illustrated in FIG. 24, the memory controller 1 according to the fourth embodiment includes a Vth tracking processing section 110b and a parameter storage section 120b. The parameter storage section 120b may be an SRAM. The peripheral circuit 220 of the memory device 2 according to the fourth embodiment includes a shift read operation processing section 221 and an on-chip Vth tracking processing section 222. The configuration of the shift read operation processing section 221 of the fourth embodiment is similar to that of the second embodiment.

The on-chip Vth tracking processing section 222 is a functional block that executes processing related to Vth tracking including at least a search read operation. The search read operation is a read operation using a plurality of read levels executed by the memory device 2 based on a predetermined command set. The on-chip Vth tracking processing section 222 can collectively execute processing corresponding to a plurality of times of shift read operations of the Vth tracking described in the first to third embodiments. Then, the on-chip Vth tracking processing section 222 can calculate a detected search number and an adjustment coefficient based on a read result using a plurality of read levels. The detected search number is information of the read level corresponding to the minimum value of the differences of the number of on-cells obtained by using the plurality of read levels. The adjustment coefficient is, for example, information corresponding to a difference between the read level corresponding to the detected search number and the optimum read level. The on-chip Vth tracking processing section 222 can change the setting of the read level used in a shift read operation based on an instruction from the Vth tracking processing section 110b.

The Vth tracking processing section 110b has a function of estimating the optimum read level in consideration of asymmetry of the threshold voltage distribution of the memory cell transistor MT. For example, the Vth tracking processing section 110b first transmits an optimum read level estimation request using a step value corresponding to symmetric threshold voltage distribution of adjacent states to the on-chip Vth tracking processing section 222. Then, the Vth tracking processing section 110b changes the start read level of the Vth tracking based on the estimation result of the optimum read level executed by the on-chip Vth tracking processing section 222. Then, the Vth tracking processing section 110b transmits an optimum read level estimation request using a step value corresponding to asymmetric threshold voltage distribution of adjacent states to the on-chip Vth tracking processing section 222.

The Vth tracking processing section 110b includes an error correction code (ECC) processing section 111. The ECC processing section 111 includes the error correction code (ECC) circuit 13. The ECC processing section 111 executes decoding processing on page data received from the shift read operation processing section 221. In a case where the decoding processing by the ECC processing section 111 is successful, the Vth tracking processing section 110b outputs the corrected page data to the host device HD. On the other hand, in a case where the decoding processing by the ECC processing section 111 fails, the Vth tracking processing section 110b changes the start read level and the step value of the Vth tracking and transmits the optimum read level estimation request to the on-chip Vth tracking processing section 222.

The parameter storage section 120b stores a start value table 121 and a step value table 123. The configuration of the start value table 121 is similar to that of the second embodiment described with reference to FIG. 16, for example, and is used for setting the start read level of the search read operation. The step value table 123 stores information of a plurality of step values used in the search read operation for each of adjacent states that can be subject to the search read operation. The step value stored in the step value table 123 is preset, for example, according to information related to gradients of adjacent states.

(Specific Example of Step Value Table 123)

FIG. 25 is a diagram illustrating an example of the step value table 123 stored in the parameter storage section 120b of the memory controller 1 included in the memory system MS according to the fourth embodiment. As illustrated in FIG. 25, the step value table 123 stores, for example, two step values SSa and SSb used in a search read operation for each of states S0-S1, states S1-S2, . . . , and states S6-S7 for each of index values (for example, #0 to #4). The step value is represented by, for example, a DAC value. The step value SSa is a step value used to set a first half (for example, a low voltage side) read level among a plurality of read levels used in the search read operation. The step value SSb is a step value used to set a second half (for example, a high voltage side) read level among a plurality of read levels used in the search read operation. The switching point of the step values SSa and SSb is designated by, for example, a command set from the memory controller 1. Note that a median of the number of searches designated by the command set from the memory controller 1 may be used as the switching point.

The index value #0 of the step value table 123 corresponds to a symmetric threshold voltage distribution of adjacent states. The index value #1 and subsequent index values of the step value table 123 correspond to asymmetric threshold voltage distribution of adjacent states.

Specifically, in the row of the index value #0, SSa=8 and SSb=8 are associated with each of a plurality of fields associated with states S0-S1, states S1-S2, states S5-S6, and states S6-S7. In the row of the index value #1, the step value SSb of states S0-S1 and the step value SSa of states S6-S7 are changed to 4 from those of the row of the index value #0. In the row of the index value #2, the step value SSb of states S1-S2 and the step value SSa of states S5-S6 are changed to 4 from those of the row of the index value #1. In the row of the index value #3, the step value SSa of states S0-S1 and the step value SSb of states S5-S6 are changed to 16 from those of the row of the index value #2. In the row of the index value #4, the step value SSa of states S1-S2 and the step value SSb of states S6-S7 are changed to 16 from those of the row of the index value #3.

As described above, in the step value table 123, the symmetric step values SSa and SSb are set in the row of the index value #0 in any adjacent states, and the asymmetric step values SSa and SSb are set in at least some adjacent states after the index value #1. Further, in the step value table 123, the step values SSa and SSb of states S2-S3, states S3-S4, and states S4-S5 are set to "n/a" in the rows of all the index values. Here, "n/a" means to execute a search read operation using a single type of step value. Note that, however, in each of states S2-S3, states S3-S4, and states S4-S5, a search read operation using a plurality of step values different from each other may be executed. The adjacent states to which a search read operation using the plurality of mutually different step values is applied and the adjacent states to which a search read operation using the single type of step value is applied can be appropriately changed according to the gradient of the assumed threshold voltage distribution.

<4-2> Operation

Next, an operation of the memory system MS according to the fourth embodiment will be described.

FIG. 26 is a flowchart illustrating an example of a procedure of Vth tracking executed in the memory system according to the fourth embodiment.

The memory system MS starts a series of processing illustrated in FIG. 26, for example, in a case where error correction of data read from the memory device 2 fails in a read operation or based on a predetermined schedule (Start).

First, the Vth tracking processing section 110b sets the index value to a value #0 corresponding to the symmetric threshold voltage distribution of the adjacent states (ST401).

Next, the Vth tracking processing section 110b estimates an optimum read level assuming symmetry (ST402). In the processing of step ST402, the Vth tracking processing section 110b causes the memory device 2 to execute a search read operation using the parameter corresponding to the index value #0 in the start value table 121 and the step value table 123, and causes the memory device 2 to estimate the optimum read level not considering asymmetry.

Next, the Vth tracking processing section 110b increments the index value in the step value table 123 (ST403).

Next, the Vth tracking processing section 110b estimates an optimum read level in consideration of asymmetry of the threshold voltage distribution (ST404). In the processing of step ST404, the Vth tracking processing section 110b causes the memory device 2 to execute a search read operation using, for example, the step value corresponding to the index value #1 in the step value table 123 and a start read level at which the optimum read level estimated by the processing of step ST402 coincides with the switching point of this step value.

Next, the Vth tracking processing section 110b executes a page read operation using the estimated optimum read level (ST405). In the processing of step ST405, the Vth tracking processing section 110b causes the memory device 2 to execute the page read operation using the optimum read level estimated by the processing of step ST404.

Next, the Vth tracking processing section 110b determines whether or not error correction has succeeded for the page data obtained by the page read operation in step ST405 (ST406).

If it is not determined in the processing of step ST406 that error correction has succeeded, that is, if error correction has failed (ST406: NO), the Vth tracking processing section 110b proceeds to processing of step ST403. That is, the Vth tracking processing section 110b executes the processing of steps ST404 to ST406 again using the parameter corresponding to the incremented index value of the step value table 123.

If it is determined that error correction has succeeded in the processing of step ST406 (ST406: YES), the Vth tracking processing section 110b outputs corrected page data to the host device HD (ST407).

(1: Specific Example of Processing in Step ST402)

FIG. 27 is a flowchart illustrating an example of a detailed procedure of the processing of step ST402 described with reference to FIG. 26.

When the processing of step ST402 starts (Start), the Vth tracking processing section 110b of the memory controller 1 issues a search read parameter setting request assuming symmetry associated with the current index value (#0) to the on-chip Vth tracking processing section 222 (ST411). In the search read parameter included in the setting request in the processing of step ST411, the step value SSa and the step value SSb are equal.

Next, the on-chip Vth tracking processing section 222 of the memory device 2 sets the search read parameter based on the setting request (ST412). As a result, a plurality of read levels based on a single type of step value can be used in the search read operation.

Next, the Vth tracking processing section 110b issues a search read request to the on-chip Vth tracking processing section 222 (ST413). Then, the on-chip Vth tracking processing section 222 executes the search read operation based on the search read request (ST414). In the search read operation in the processing of step ST414, a plurality of read levels based on a single type of step value are used. In addition, the on-chip Vth tracking processing section 222 acquires the detected search number and the adjustment coefficient based on the result of the search read operation.

Next, the on-chip Vth tracking processing section 222 outputs valley position information (the detected search number and the adjustment coefficient) acquired by the search read operation to the Vth tracking processing section 110b (ST415).

Next, the Vth tracking processing section 110b estimates a valley position (that is, the optimum read level) of the threshold voltage distribution of the adjacent states based on the valley position information (ST416). When the processing of step ST416 is completed, the series of processing included in step ST402 ends (End).

Note that the estimation of the optimum read level in the processing of step ST402 is not limited to the method using the search read operation by the on-chip Vth tracking processing section 222 described above. As a method of estimating the optimum read level, a shift read operation performed a plurality of times by the Vth tracking processing section 110b may be used. Furthermore, the Vth tracking processing section 110b may estimate the optimum read level using other methods and proceed to the processing of step ST403. In the processing of step ST402, the index value is not necessarily used. In this case, asymmetric step values SSa and SSb can be set from the row of the index value #0 of the step value table 123.

(2: Specific Example of Processing in Step ST404)

Figure 28:
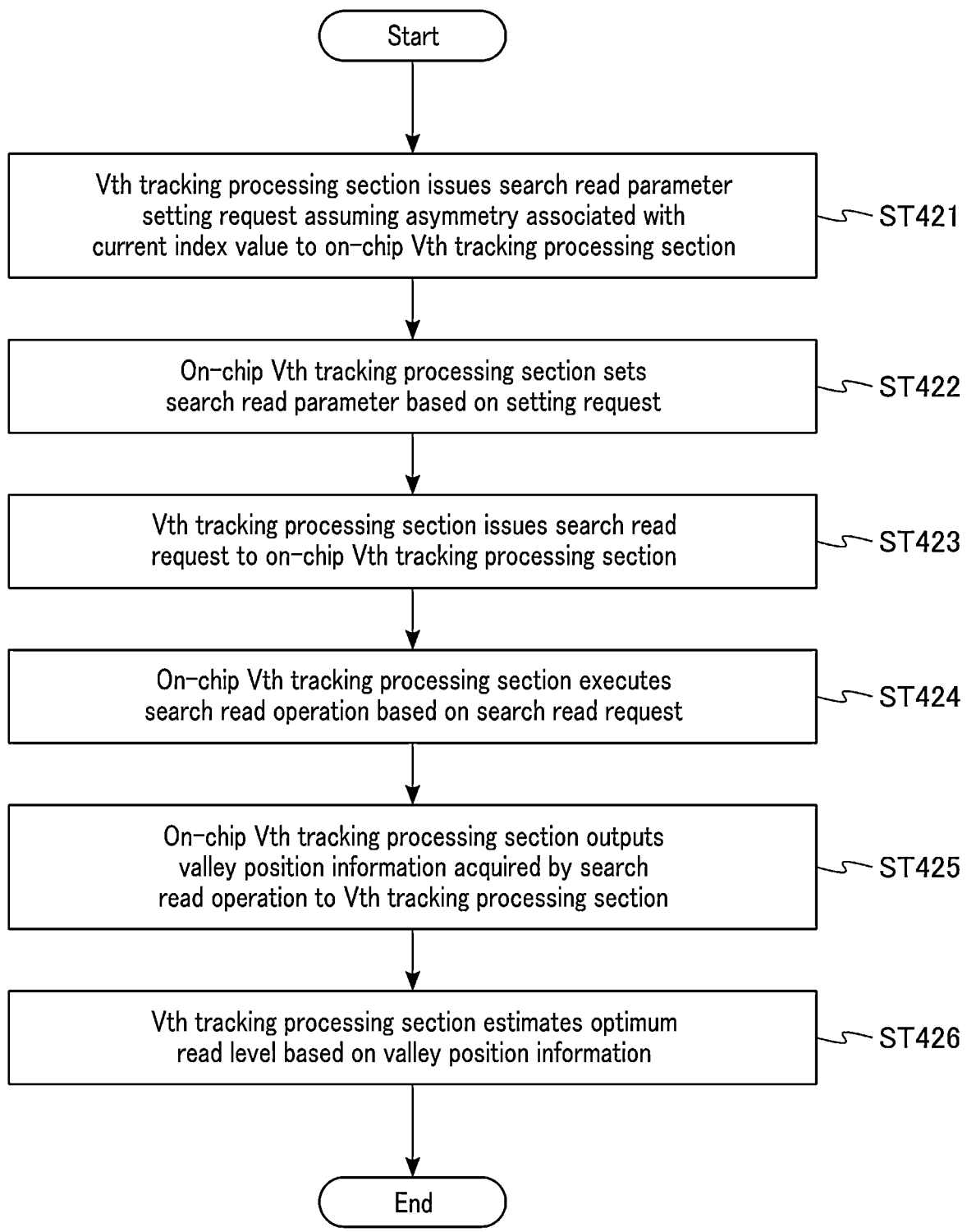
FIG. 28 is a flowchart illustrating an example of a detailed procedure of another part of processing of Vth tracking executed in the memory system according to the fourth embodiment.

FIG. 28 is a flowchart illustrating an example of a detailed procedure of the processing of step ST404 described with reference to FIG. 26.

When the processing of step ST404 starts (Start), the Vth tracking processing section 110b of the memory controller 1 issues a search read parameter setting request assuming asymmetry associated with the current index value to the on-chip Vth tracking processing section 222 (ST421). In the search read parameter included in the setting request in the processing of step ST421, the step value SSa and the step value SSb are different from each other. Furthermore, the Vth tracking processing section 110b sets the start read level such that the switching point of the step values SSa and SSb coincide with the optimum read level estimated by the processing of step ST402 described with reference to FIG. 26. Details of the setting of the start read level will be described later.

Next, the on-chip Vth tracking processing section 222 of the memory device 2 sets the search read parameter based on the setting request (ST422). As a result, a plurality of read levels based on a plurality of step values different from each other can be used in the search read operation.

Next, the Vth tracking processing section 110b issues a search read request to the on-chip Vth tracking processing section 222 (ST423). Then, the on-chip Vth tracking processing section 222 executes the search read operation based on the search read request (ST424). In the search read operation in the processing of step ST424, a plurality of read levels based on the plurality of step values different from each other can be used. In addition, the on-chip Vth tracking processing section 222 acquires the detected search number and the adjustment coefficient based on the result of the search read operation.

Next, the on-chip Vth tracking processing section 222 outputs valley position information (the detected search number and the adjustment coefficient) acquired by the search read operation to the Vth tracking processing section 110b (ST425).

Next, the Vth tracking processing section 110b estimates the optimum read level based on the valley position information (ST426). When the processing of step ST426 is completed, the series of processing included in step ST404 ends (End).

(3: Specific Example of Processing in Step ST405)

Figure 29:
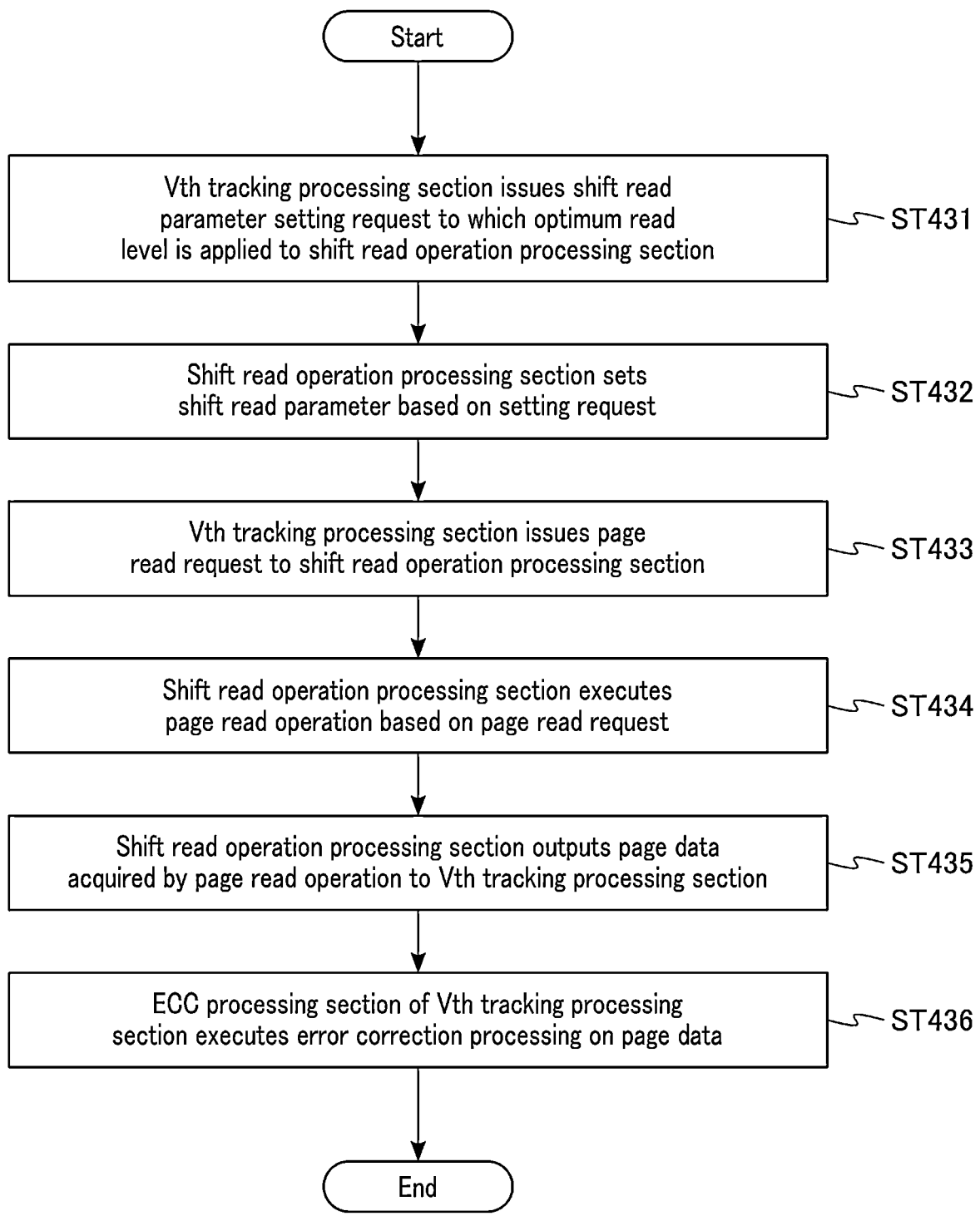
FIG. 29 is a flowchart illustrating an example of a detailed procedure of still another part of processing of Vth tracking executed in the memory system according to the fourth embodiment.

FIG. 29 is a flowchart illustrating an example of a detailed procedure of the processing of step ST405 described with reference to FIG. 26.

When the processing of step ST405 is started (Start), the Vth tracking processing section 110b of the memory controller 1 issues a page read parameter setting request to which the estimated optimum read level is applied to the shift read operation processing section 221 (ST431). This optimum read level is based on the result of the processing in step ST426 executed most recently. In the processing of step ST431, for example, the command set CS1 illustrated in FIG. 20 is used.

Next, the shift read operation processing section 221 of the memory device 2 sets the parameter based on the setting request (ST432). As a result, in the page read operation, the optimum read level based on the result of the Vth tracking is used.

Next, the Vth tracking processing section 110b issues a page read request to the shift read operation processing section 221 (ST433). In the processing of step ST433, for example, the command set CS2 illustrated in FIG. 20 is used. Then, the shift read operation processing section 221 executes the page read operation based on the page read request (ST434). In the page read operation in the processing of step ST434, the optimum read level based on the result of Vth tracking is used. The page data acquired by the page read operation is stored in, for example, the data register 28.

Next, the shift read operation processing section 221 outputs the page data acquired by the page read operation to the Vth tracking processing section 110b (ST435). In the processing of step ST435, for example, the command set CS3 illustrated in FIG. 20 is used. Then, the ECC processing section 111 of the Vth tracking processing section 110b executes error correction processing on the page data read by the processing of step ST435 (ST436). When the processing of step ST436 is completed, the series of processing included in step ST405 ends (End).

(4: Specific Example of Command Sequence)

FIG. 30 is a table illustrating an example of a command sequence used in the memory system MS according to the fourth embodiment. As illustrated in FIG. 30, the memory system MS can use, for example, command sets CS4 to CS8 in addition to the command sets CS1 to CS3 described with reference to FIG. 20. The command sets CS4 to CS6 are used, for example, in the search read parameter setting request in the processing of ST411 of FIG. 27 or ST421 of FIG. 28. The command set CS7 is used, for example, in the search read request in the processing of ST413 of FIG. 27 or ST423 of FIG. 28. The command set CS8 is used, for example, for an output request of the valley position information in the processing of ST415 of FIG. 27 or ST425 of FIG. 28.

The command set CS4 includes, for example, "cch", "ADD (LUN)", "ADD (BBh)", and "DAT2". Here, "cch" is a command for requesting change of the search read parameter, and "ADD (BBh)" is an address of a register that stores the setting of a start read level used in the search read operation. Further, "DAT2" includes a parameter corresponding to a newly set start read level of a search read operation. When receiving "cch", "ADD (LUN)", "ADD (BBh)", and "DAT2" in this order from the memory controller 1, the memory device 2 transitions to the busy state and sets the parameter "DAT1" in the register designated by "ADD (LUN)" and "ADD (BBh)". When the parameter setting is completed, the memory device 2 transitions to the ready state. The time tFEAT indicates a time when the memory device 2 executes processing based on the command set CS4.

The command set CS5 has a configuration in which "ADD (BBh)" is replaced with "ADD (CCh)" and "DAT2" is replaced with "DAT3" with respect to the command set CS4. Here, "ADD (CCh)" is, for example, an address of a register that stores the step value SSa of the search read operation and the search count in the first half (for example, the number of times of shift read operations to which the step value SSa is applied). Further, "DAT3" includes, for example, a newly set step value SSa of the search read operation and a parameter corresponding to the search count in the first half. When receiving "cch", "ADD (LUN)", "ADD (CCh)", and "DAT3" in this order from the memory controller 1, the memory device 2 sets the parameter "DAT3" in the register designated by "ADD (LUN)" and "ADD (CCh)".

The command set CS6 has a configuration in which "ADD (BBh)" is replaced with "ADD (DDh)" and "DAT2" is replaced with "DAT4" with respect to the command set CS4. Here, "ADD (DDh)" is, for example, an address of a register that stores the step value SSb of the search read operation and the search count in the second half (for example, the number of times of shift read operations to which the step value SSb is applied). Further, "DAT4" includes a newly set step value SSb of the search read operation and a parameter corresponding to the search count in the second half. When receiving "cch", "ADD (LUN)", "ADD (DDh)", and "DAT4" in this order from the memory controller 1, the memory device 2 sets the parameter "DAT4" in the register designated by "ADD (LUN)" and "ADD (DDh)".

The command set CS7 includes, for example, "ddh", "01h/02h/03h", "00h", "ADD (CUsel)", and "30h". Here, "ddh" is a command requesting execution of the search read operation, and "ADD (CUsel)" is an address of a cell unit CU subject to the search read operation. Further, "30h" is a command for instructing the start of the read operation. When receiving "ddh", "01h/02h/03h", "00h", "ADD (CUsel)", and "30h" in this order from the memory controller 1, the memory device 2 transitions to the busy state and executes the search read operation of page data "designated by "01h/02h/03h" at the address designated by "ADD (CUsel)". When the search read operation is completed, the memory device 2 transitions to the ready state. The time tR indicates a time when the memory device 2 executes processing based on the command set CS7.

The command set CS8 includes, for example, "eeh" and "ADD (EEh)". Here, "eeh" is a command for requesting an output of data or the like stored in a register. Further, "ADD (EEh)" is an address of a register that stores the detected search number and the adjustment coefficient obtained by the search read operation in ST414 of FIG. 27 or ST424 of FIG. 28. When receiving "eeh" and "ADD (EEh)" from the memory controller 1 in this order, the memory device 2 outputs the detected search number and the adjustment coefficient stored in the register designated by "ADD (EEh)" to the memory controller 1. Note that, in ST414 of FIG. 27 and ST424 of FIG. 28, the detected search number and the adjustment coefficient may be stored in the same register or may be stored in different registers.

Depending on the type of the search read parameter to be set, only a part of the command sets CS4 to CS6 may be used in the processing of ST411 of FIG. 27 or ST421 of FIG. 28. The command set CS used for setting the search read parameter can be issued for each state in a case where a read operation for a plurality of states is executed.

(5: Specific Example of Search Read Operation)

FIG. 31 is a diagram illustrating a specific example of a voltage applied to a word line WL selected as the target of the search read operation in the memory system MS according to the fourth embodiment. In the graph illustrated in FIG. 31, the horizontal axis represents time, and the vertical axis represents the voltage applied to the selected word line WL.

This example illustrates a case where a search read operation using seven types of read levels is executed for each state. As illustrated in FIG. 31, in the search read operation in this example, the search read operation for states S0-S1 (states S0-S1 tracking) and the search read operation for states S4-S5 (states S4-S5 tracking) are continuously executed.

In the states S0-S1 tracking, the read levels RL1 (1) to RL1 (7) are applied to the selected word line WL in the order of the read levels RL1 (1) to RL1 (7). The read levels RL1 (1) to RL1 (7) correspond to the seven types of read levels associated with the states S0-S1 tracking, respectively. The sequencer 24 asserts the control signal STB in each of a plurality of periods in which the read levels RL1 (1) to RL1 (7) are respectively applied, and causes the sense amplifier module 29 to determine data. In the states S0-S1 tracking, a portion between the read levels RL1 (4) and RL1 (5) is set as a switching point of the step values SSa and SSb. Here, the step value set for the states S0-S1 tracking are set to SSb>SSa.

In the states S4-S5 tracking, the read levels RL5 (1) to RL5 (7) are applied to the selected word line WL in the order of the read levels RL5 (1) to RL5 (7). The read levels RL5 (1) to RL5 (7) correspond to the seven types of read levels associated with the states S4-S5 tracking, respectively. The sequencer 24 asserts the control signal STB in each of a plurality of periods in which the read levels RL5 (1) to RL5 (7) are respectively applied, and causes the sense amplifier module 29 to determine data. The step values of the states S4-S5 tracking are set to SSa=SSb based on the states S4-S5 being symmetric. That is, in the states S4-S5 tracking, a plurality of different step values are not applied, and a single type of step value is used.

(6: Specific Example of Search Read Processing)

FIG. 32 is a schematic diagram illustrating a specific example of a process of estimating an optimum read level in Vth tracking of the memory system MS according to the fourth embodiment. FIG. 32 illustrates threshold voltage distributions of adjacent states (state S (L−1) and state S (L)) and processing of a search read operation. The search number (SN) indicates the order in which a shift read operation is executed during the search read operation. The search number (0) corresponds to the start point of the search read operation. In the shift read operation at the start point of the search read operation, the start read level is used.

As illustrated in FIG. 32, in the present example, search read operations using eight types of read levels are executed. Then, between the search numbers (4) and (5) is set the switching point of the step values SSa and SSb. The parameters used for the search read operations are a start point offset (SPO), step values SSa and SSb, and the search counts (also referred to as Searching Counts in formulas to be described below) in the first half and the second half. In addition, the information output by the memory device 2 based on the result of the search read operations is the detected search number (also referred to as Detected Search Number in formulas to be described below) and the adjustment coefficient (also referred to as Adjustment Coefficient in formulas to be described below). Hereinafter, a specific example of processing of the search read operation will be described.

First, the read operation is started from the position designated by the start point offset SPO (that is, the start read level) with reference to the default read level DRL. Next, the read operation in which the read level is shifted is executed the number of search counts. Specifically, the read operations in which the read level is shifted by the step value SSa are executed in the first half of the search counts. Then, the read operations in which the read level is shifted by the step value SSb are executed in the second half of the search counts. Note that, here, the default read level DRL, the start point offset SPO, and the step values SSa and SSb are designated by DAC values.

Next, a difference BC between the numbers of on-cells of consecutive read operations is calculated. Next, a search number corresponding to the minimum difference BC (best) is acquired as the detected search number. For example, in a case where the read operation at the start point offset SPO corresponds to the search number (0) and the difference between the search number (4) and the search number (5) is BC (best), the detected search number is (4). Next, an internal division point calculation is performed using the differences BC (prev) and BC (next) before and after the difference BC (best), and the calculation result is acquired as the adjustment coefficient. The adjustment coefficient is calculated, for example, by the following Formula (1).

(Formula 1)

$$\text{Adjustment Coefficient} = \frac{BC(\text{next}) - BC(\text{prev})}{BC(\text{next}) - BC(\text{best}) + BC(\text{prev}) - BC(\text{best})} \quad (1)$$

The optimum read level (RTRK) obtained by the search read operation can be estimated based on the following Formula (2) or (3). Note that Formula (2) is used in a case where the step value corresponding to the difference BC (best) is SSa, and Formula (3) is used in a case where the step value corresponding to the difference BC (best) is SSb. Specifically, assuming that the step value between the search numbers (3) and (4) is SSa, the step value between the search numbers (4) and (5) is SSb, and the step value between the search numbers (5) and (6) is SSb, Formula (2) is used in a case where the difference between the search numbers (3) and (4) is BC (best), and Formula (3) is used in a case where the difference between the search numbers (4) and (5) is BC (best).

(Formula 2)

$$RTRK = (DRL + SPO) + \quad (2)$$

$$(\text{Detected Search Number} * SSa) + (\text{Adjustment Coefficient} * SSa)$$

(Formula 3)

$$RTRK = (DRL + SPO) + \quad (3)$$

$$(\text{Detected Search Number} * SSa) + (\text{Adjustment Coefficient} * SSb)$$

For example, if DRL=30DAC, SPO=−20DAC, SSa=4DAC, Adjust Coefficient=½, Detected Search Number=2, and the step value corresponding to the difference BC (best) is SSa, RTRK is (30−20)+(2*4)+(½*4)=20DAC.

The start point offset SPO (for example, the start read level used in the processing of step ST404 described with reference to FIG. 26) used in the search read operation can be adjusted based on the following Formula (4). Note that RTRK (#0) is a valley position (for example, the optimum read level estimated in the processing of step ST402 described with reference to FIG. 26) obtained by the search read processing using the search read parameter in which the step value SSa is equal to the step value SSb.

(Formula 4)

$$SPO = RTRK(\#0) - \left(SSa * \text{Searching Counts} * \frac{1}{2}\right) - DRL \quad (4)$$

For example, if RTRK (#0)=20DAC, SSa=4DAC, Searching Counts=10, and DRL=30DAC, the SPO is 20−(4*10*½)−30=−30DAC.

<4-3> Advantageous Effects of Fourth Embodiment

As described above, in the memory system MS according to the fourth embodiment, a plurality of combinations of the step values SSa and SSb are prepared in advance. Then, in a case where error correction of page data read using the optimum read level estimated based on a search read operation fails, the memory system MS according to the fourth embodiment changes the search read parameter in the order of the index value and retries the shift read operation. As a result, the memory system MS according to the fourth embodiment can improve the accuracy of the estimation of the optimum read level in the Vth tracking. Therefore, the memory system MS according to the fourth embodiment can reduce the number of error bits and obtain high reliability.

In the memory system MS according to the fourth embodiment, after the valley position (that is, the optimum read level) is estimated by a search read operation using a single type of step value, the switching point of the step values SSa and SSb of the search read operation is matched with the valley position. As a result, the memory system MS according to the fourth embodiment can improve the accuracy of the estimation of the optimum read level based on the Vth tracking, and can improve the reliability.

Furthermore, in the memory system MS according to the fourth embodiment, the memory device 2 can execute a read operation using a plurality of read levels based on a search read request received from the memory controller 1. Therefore, in the memory system MS according to the fourth embodiment, exchange of commands and the like between the memory controller 1 and the memory device 2 required for Vth tracking can be reduced as compared with the first to third embodiments. Therefore, the memory system MS according to the fourth embodiment can further improve the performance as compared with the first to third embodiments.

In the fourth embodiment, the case where two step values SSa and SSb are set has been exemplified, but three or more step values may be set in the search read operation. The switching point of the step values SSa and SSb is not limited to the center of the search counts, and may be switched at a point other than the center of the search counts. Each formula described in the fourth embodiment is merely an example. A coefficient or an offset may be added in accordance with the characteristics of the memory cell transistor MT. The start point of the search read operation can be appropriately changed based on predetermined information. A fixed value may be selected as the start point of the search read operation.

<5> Others

The functional configuration of the memory controller 1 described in the second to fourth embodiments can be realized by firmware executed by the CPU 12 in the hardware configuration of the memory controller 1 described in the first embodiment. The functional configuration of the memory device 2 described in the second to fourth embodiments can be realized by the function allocated to the sequencer 24 in the hardware configuration of the memory device 2 described in the first embodiment. A micro processing unit (MPU) may be used instead of the CPU 12. In addition, each of the processing described in the above embodiments can be executed by a dedicated hardware circuit, a processor that executes a program (firmware), or a combination thereof.

The command sequences exemplified in the above embodiment are merely an example. The address information (ADD) transmitted from the memory controller 1 to the memory device 2 may be one cycle or a plurality of cycles.

The flowcharts used for the description in the above embodiments are merely examples. The order of each processing described with reference to the flowcharts may be interchanged as much as possible. Other processing may be added to the processing illustrated in the flowcharts, or some processing may be omitted.

In the present specification, the term "couple" refers to electrical coupling, and does not exclude interposition of another element therebetween. "Electrically coupled" may be via an insulator as long as it can operate in the same manner as electrically coupled. The word line WL, the select gate lines SGD and SGS, and the like may be simply referred to as "interconnect".

The high-level voltage is a voltage at which the N-type transistor to which the level voltage is applied to the gate is turned on. The low-level voltage is a voltage at which the N-type transistor to which the level voltage is applied to the gate is turned off. In the present specification, applying a voltage to the word line WL corresponds to the driver circuit 26 applying a voltage to the word line WL via the row decoder module 27. Similar to the word line WL, the applying of the voltage to the other interconnects also corresponds to the applying of the voltage by the driver circuit 26 via the row decoder module 27. The voltage of each interconnect may be estimated based on the voltage of the signal line connecting the driver circuit 26 and the row decoder module 27.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
   a memory device including a plurality of memory cells, each of the plurality of memory cells being configured to non-volatilely store data including at least a first value or a second value according to a threshold voltage thereof, the first value corresponding to the threshold voltage included in a first voltage range, and the second value corresponding to the threshold voltage included in a second voltage range different from the first voltage range; and a memory controller electrically connected to the memory device and configured to:
- write data of the first value to each of a plurality of first memory cells among the plurality of memory cells;
- write data of the second value to each of a plurality of second memory cells among the plurality of memory cells;
- determine a first voltage based on information related to a gradient of distribution of the threshold voltage of each of the plurality of memory cells; and
- execute a tracking operation, wherein in the tracking operation, the memory controller is configured to:
- cause the memory device to execute a plurality of times of read operations on the plurality of memory cells, using a plurality of read levels in a third voltage range, the third voltage range including at least a part of the first voltage range and at least a part of the second voltage range; and
- acquire the number of on-cells that are memory cells having been turned on among the plurality of memory cells in each of the read operations, and in the tracking operation, the memory controller is further configured to:
- set a first voltage difference, the first voltage difference being a difference between two adjacent read levels of the plurality of read levels in a fourth voltage range that is lower than the first voltage in the third voltage range; and
- set a second voltage difference to be different from the first voltage difference, the second voltage difference being a difference between two adjacent read levels of the plurality of read levels in a fifth voltage range that is higher than the first voltage in the third voltage range.

2. The memory system of claim 1, wherein
the memory controller is further configured to:
- detect that a gradient of the threshold voltage distribution in the fourth voltage range is steeper than a gradient of the threshold voltage distribution in the fifth voltage range; and
- set, in response to the detection, the first voltage difference to be smaller than the second voltage difference.

3. The memory system of claim 1, wherein
the memory controller is further configured to:
- cause the memory device to execute a plurality of times of read operations on the plurality of memory cells, using a plurality of read levels in a sixth voltage range, the sixth voltage range including at least a part of the first voltage range and at least a part of the second voltage range;
- acquire the number of on-cells in each of the read operations;
- acquire a difference in the numbers of on-cells for each set of two times of read operations using two adjacent read levels of the plurality of read levels in the sixth voltage range;
- detect a seventh voltage range in which the difference decreases with an increase in a read level and an eighth voltage range in which the difference increases with an increase in a read level; and
- determine the first voltage from a voltage range between the seventh voltage range and the eighth voltage range.

4. The memory system of claim 3, wherein
the memory controller is further configured to:
- acquire the difference a plurality of times;
- acquire a first difference between the minimum difference among the differences and a previous difference of the minimum difference;
- acquire a second difference between the minimum difference and a next difference of the minimum difference; and
- if a third difference that is a difference between the first difference and the second difference is smaller than a first threshold value, determine the first voltage difference and the second voltage difference according to the third difference.

5. The memory system of claim 4, wherein
the memory controller is further configured to:
- if the third difference is larger than or equal to the first threshold value,
  - change at least one of the plurality of read levels in the third voltage range; and
  - execute the tracking operation.

6. The memory system of claim 3, wherein
the memory controller is further configured to:
- acquire the difference a plurality of times;
- calculate a first difference between the minimum difference among the differences and a previous difference of the minimum difference;
- calculate a second difference between the minimum difference and a next difference of the minimum difference;
- acquire a ratio between the first difference and the second difference; and
- if the ratio is larger than a second threshold value and smaller than a third threshold value, determine the first voltage difference and the second voltage difference according to the ratio.

7. The memory system of claim 6, wherein
the memory controller is further configured to:
- if the ratio is smaller than or equal to the second threshold value or larger than or equal to the third threshold value,
  - change at least one of the plurality of read levels in the third voltage range; and
  - execute the tracking operation.

8. The memory system of claim 1, wherein
the information includes a value of a voltage belonging to the first voltage range and a value of a voltage belonging to the second voltage range.

9. The memory system of claim 1, wherein
the information is any one of positions of the memory cells in the memory device, the number of times of read operations, an elapsed time after writing of data, and the number of times of write and erase operations.

10. A memory system comprising:
a memory device including a plurality of memory cells, each of the plurality of memory cells being configured to non-volatilely store data including at least a first value or a second value according to a threshold voltage thereof, the first value corresponding to the threshold voltage included in a first voltage range, and the second value corresponding to the threshold voltage included in a second voltage range different from the first voltage range; and
a memory controller electrically connected to the memory device and configured to:
- write data of the first value to each of a plurality of first memory cells among the plurality of memory cells;

write data of the second value to each of a plurality of
second memory cells among the plurality of memory
cells; and
execute a tracking operation, wherein
in the tracking operation, the memory controller is configured to:
cause the memory device to execute a plurality of times
of read operations on the plurality of memory cells,
using a plurality of read levels in a third voltage
range, the third voltage range including at least a part
of the first voltage range and at least a part of the
second voltage range; and
acquire the number of on-cells that are memory cells
having been turned on among the plurality of
memory cells in each of the read operations, and
the memory controller is further configured to:
execute the tracking operation a plurality of times;
in a first tracking operation among the tracking operations, estimate a gradient of distribution of the
threshold voltage of each of the plurality of memory
cells based on the number of on-cells acquired;
determine a first voltage based on the estimated gradient; and
in a second tracking operation executed after the first
tracking operation among the tracking operations,
set a first voltage difference, the first voltage difference being a difference between two adjacent read
levels of the plurality of read levels in a fourth
voltage range that is lower than the first voltage in
the third voltage range; and
set a second voltage difference to be different from
the first voltage difference, the second voltage
difference being a difference between two adjacent
read levels of the plurality of read levels in a fifth
voltage range that is higher than the first voltage in
the third voltage range.

11. The memory system of claim 10, wherein
the memory controller is further configured to
in the first tracking operation, set voltage differences
between two adjacent read levels of the plurality of
read levels in the third voltage range to be equal to
each other.

12. The memory system of claim 10, wherein
the memory controller is further configured to
set a voltage difference between two adjacent read
levels of the plurality of read levels in the third
voltage range of the first tracking operation and a
voltage difference between two adjacent read levels
of the plurality of read levels in the third voltage
range of the second tracking operation to be different
from each other.

13. The memory system of claim 10, wherein
the memory controller is further configured to
manage a plurality of the first voltage differences to be
used in the second tracking operation.

14. The memory system of claim 13, wherein
the memory controller is further configured to
determine the first potential difference used for the
second tracking operation from the managed first
potential differences based on any one of the number
of times of read operations, an elapsed time after
writing data, and the number of times of write and
erase operations.

15. A memory device comprising:
a plurality of memory cells, each of the plurality of
memory cells being configured to non-volatilely store
data including at least a first value or a second value
according to a threshold voltage thereof, the first value
corresponding to the threshold voltage included in a
first voltage range, and the second value corresponding
to the threshold voltage included in a second voltage
range different from the first voltage range; and
a peripheral circuit electrically connected to the plurality
of memory cells and configured to:
write data of the first value to each of a plurality of first
memory cells among the memory cells;
write data of the second value to each of a plurality of
second memory cells among the memory cells; and
execute a search read operation, wherein
in the search read operation, the peripheral circuit is
configured to:
execute a plurality of times of read operations on the
plurality of memory cells, using a plurality of read
levels in a third voltage range, the third voltage range
including at least a part of the first voltage range and
at least a part of the second voltage range; and
acquire the number of on-cells that are memory cells
having been turned on among the plurality of
memory cells in each of the read operations, and
in the search reading, the peripheral circuit is further
configured to:
set a first voltage difference, the first voltage difference
being a difference between two adjacent read levels
of the plurality of read levels in a fourth voltage
range that is lower than a first voltage in the third
voltage range; and
set a second voltage difference to be different from the
first voltage difference, the second voltage difference
being a difference between two adjacent read levels
of the plurality of read levels in a fifth voltage range
that is higher than the first voltage in the third voltage
range.

16. The memory device of claim 15, wherein
the peripheral circuit is further configured to:
acquire a difference in the numbers of on-cells for each
set of two times of read operations using two adjacent read levels of the plurality of read levels in the
third voltage range; and
output the acquired difference externally.

17. The memory device of claim 16, wherein
the peripheral circuit is further configured to:
acquire the difference a plurality of times; and
output information related to a read level corresponding
to the minimum difference among the differences
externally.

18. The memory device of claim 17, wherein
the peripheral circuit is further configured to
perform an internal division point calculation using a
difference before and after the minimum difference
among the differences, and output a result of the
internal division point calculation externally.

19. A memory system comprising:
the memory device according to claim 15; and
a memory controller configured to request the memory
device to change a setting of a parameter of the search
read operation and execute the search read operation.

20. The memory system of claim 19, wherein
the peripheral circuit is further configured to
output a result of the search read operation to the
memory controller, and
the memory controller is further configured to:
calculate a first read voltage based on the result of the
search read operation;

instruct the memory device to perform a read operation using the first read voltage;
execute error correction of data read by the first read operation; and
in a case where the error correction fails, request the memory device again to execute the search read operation in which at least one of the first voltage difference and the second voltage difference is changed.

* * * * *